(12) United States Patent
Harada et al.

(10) Patent No.: US 10,229,772 B2
(45) Date of Patent: Mar. 12, 2019

(54) PRESSURE-SENSITIVE ADHESIVE TAPE

(71) Applicant: NITTO DENKO CORPORATION, Ibaraki-shi, Osaka (JP)

(72) Inventors: Tomohito Harada, Ibaraki (JP); Bojun Chen, Kaohsiung (TW)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/083,748

(22) Filed: Mar. 29, 2016

(65) Prior Publication Data

US 2016/0289505 A1 Oct. 6, 2016

(30) Foreign Application Priority Data

Apr. 1, 2015 (JP) ................... 2015-075201
Jul. 2, 2015 (JP) ................... 2015-133295
Dec. 28, 2015 (JP) ................... 2015-257441

(51) Int. Cl.
| | | |
|---|---|---|
| H01B 7/17 | (2006.01) | |
| C09J 7/38 | (2018.01) | |
| C09J 7/22 | (2018.01) | |
| C09J 107/02 | (2006.01) | |
| C08K 5/01 | (2006.01) | |

(Continued)

(52) U.S. Cl.
CPC ............. *H01B 7/17* (2013.01); *C09J 7/22* (2018.01); *C09J 7/245* (2018.01); *C09J 7/38* (2018.01); *C09J 107/02* (2013.01); *H01B 3/443* (2013.01); *H01B 7/0045* (2013.01); *C08K 5/0016* (2013.01); *C08K 5/098* (2013.01); *C09J 2201/606* (2013.01); *C09J 2201/622* (2013.01); *C09J 2203/302* (2013.01); *C09J 2205/106* (2013.01); *C09J 2407/00* (2013.01);

(Continued)

(58) Field of Classification Search
None
See application file for complete search history.

(56) References Cited

U.S. PATENT DOCUMENTS 4,433,105 A * 2/1984 Matsuda ............... C08F 8/22
525/211
6,037,054 A * 3/2000 Shirai ................ C09J 7/0246
428/355 BL (Continued)

FOREIGN PATENT DOCUMENTS

| EP | 1 431 361 A1 | 6/2004 |
|---|---|---|
| EP | 2 108 686 A1 | 10/2009 |
| JP | 08-259909 A | 10/1996 |
| JP | 2007-510011 A | 4/2007 |
| JP | 2009-249510 A | 10/2009 |
| WO | 2014/199992 A1 | 12/2014 |

OTHER PUBLICATIONS

Extended European Search Report dated Aug. 5, 2016, from the European Patent Office in counterpart European application No. 16160550.6.

(Continued)

*Primary Examiner* — Frank D Ducheneaux
(74) *Attorney, Agent, or Firm* — Sughrue Mion, PLLC

(57) ABSTRACT

This invention provides a PSA tape that comprises a PVC film comprising a plasticizer, and a PSA layer placed at least on one face of the PVC film The PSA tape yields a condensation amount of 5 mg or less in a condensation amount measurement carried out by storing a piece of the PSA tape having a surface area equivalent to a circle of 80 mm diameter at 120° C. for 16 hours.

17 Claims, 1 Drawing Sheet

(51) Int. Cl.
*H01B 7/00* (2006.01)
*H01B 3/44* (2006.01)
*C09J 7/24* (2018.01)
C08K 5/00 (2006.01)
C08K 5/098 (2006.01)

(52) U.S. Cl.
CPC ...... *C09J 2409/00* (2013.01); *C09J 2427/006* (2013.01); *C09J 2491/00* (2013.01)

(56) References Cited

U.S. PATENT DOCUMENTS

| | | | | |
|---|---|---|---|---|
| 6,552,118 | B2 * | 4/2003 | Fujita | C08F 8/42 106/287.1 |
| 6,605,347 | B2 * | 8/2003 | Amano | C08G 18/44 428/343 |
| 2004/0157028 | A1 | 8/2004 | Wenninger et al. | |
| 2007/0071966 | A1 | 3/2007 | Mussig et al. | |
| 2009/0252958 | A1 | 10/2009 | Nishijima et al. | |

OTHER PUBLICATIONS

Communication dated Oct. 9, 2017, from the European Patent Office in counterpart European Application No. 16160550.6.
Communication dated Aug. 7, 2017 from the European Patent Office in counterpart Application No. 16 160 550.6.

* cited by examiner

[Fig. 1]
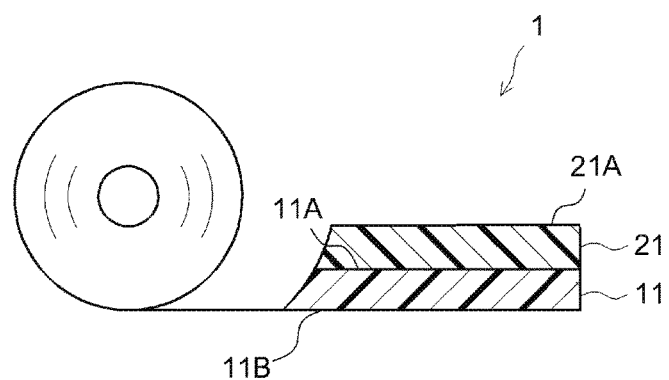
[Fig. 2]
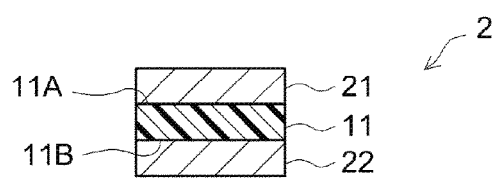

PRESSURE-SENSITIVE ADHESIVE TAPE

CROSS-REFERENCE

The present application claims priority to Japanese Patent Application No. 2015-075201 filed on Apr. 1, 2015, Japanese Patent Application No. 2015-133295 filed on Jul. 2, 2015 and Japanese Patent Application No. 2015-257441 filed on Dec. 28, 2015; and the entire contents of these applications are incorporated herein by reference.

BACKGROUND OF THE INVENTION

1. Field of the Invention

The present invention relates to a pressure-sensitive adhesive tape comprising a polyvinyl chloride (PVC) film.

2. Description of the Related Art

In general, pressure-sensitive adhesive (PSA) is a soft solid (a viscoelastic material) in a room temperature range and has a property to adhere easily to adherend with some pressure applied. With the benefit of such properties, PSA has been widely used in various industrial fields including home appliances, automobiles and OA equipment, in a form of, for instance, PSA tape having a PSA layer at least on one face of a substrate. For its great workability, PSA tape using PVC film as the substrate (which may be referred to as "PVC adhesive tape" hereinafter) has been used in various applications such as electrical insulation, wrapping and protection.

Technical literatures related to PVC adhesive tapes include Japanese Patent Application Publication No. 2009-249510. Japanese Patent Application Publication No. 2007-510011 is a technical document related to polyolefin wrapping foil.

SUMMARY OF THE INVENTION

With respect to PVC adhesive tape, Japanese Patent Application Publication No. 2007-510011 points out problems such as evaporation of plasticizer in PVC film causing clouding of automobile windshields with the vapor, that is, the occurrence of "fogging." To solve such a problem, in Japanese Patent Application Publication No. 2007-510011, a polyolefin substrate is used instead of PVC film (claim 1, paragraphs 0002 to 0003, etc.). However, PVC film has unique characteristics that make it difficult to use a polyolefin film as a substitute, leading to consistent demand for PVC adhesive tape. Thus, it will be beneficial to provide a technique to reduce the fogging related to PVC adhesive tape.

This invention has been made in view of such circumstances with an objective to provide a PVC adhesive tape that comprises a PVC film comprising a plasticizer and is less susceptible to fogging.

The PSA tape provided by the present invention comprises a polyvinyl chloride film (PVC film) which comprises a plasticizer and a PSA layer placed at least on one face of the PVC film. The PSA tape yields a condensation of 5 mg or less in a condensation amount measurement carried out by storing a piece of the PSA tape having a surface area equivalent to a circle of 80 mm diameter at 120° C. for 16 hours. By limiting the amount of condensation per area of PSA tape equivalent to a circle of 80 mm diameter (hereinafter, this may be referred to simply as the "condensation amount") to at most 5 mg, in the constitution that comprises a PVC film comprising a plasticizer, the PSA tape with which fogging is effectively reduced can be obtained.

The art disclosed herein can be preferably practiced in an embodiment where the plasticizer content in the PVC film is about 10 to 50% by weight. According to a PVC having such a composition, good anti-fogging properties (i.e. abilities to reduce fogging) and favorable flexibility tend to be combined.

The PVC film constituting the PVC adhesive tape preferably comprises an aliphatic acid metal salt. With the inclusion of the aliphatic acid metal salt in the PVC film, the condensation amount tends to decrease. As the aliphatic acid metal salt, it is preferable to use a salt comprising at least one metal species that belongs to any one of groups 1, 2, 12, 13 and 14 (but excluding Pb) of the periodic table. In particular, a salt comprising at least one metal species selected from a group consisting of Li, Na, Ca, Mg, Zn, Ba and Sn is preferable.

The PVC film constituting the PSA tape according to a preferable embodiment comprises, as the plasticizer, a polyester-based plasticizer having a molecular weight of 1000 or greater and a carboxylic acid ester having a molecular weight of less than 1000. The PVC adhesive tape having such a constitution is likely to combine anti-fogging properties and other properties (e.g. initial adhesive strength and low-temperature properties) at a high level.

In the PVC film, it is preferable that the weight $W_{PLH}$ of the polyester-based plasticizer having the molecular weight of 1000 or greater and the weight $W_{PLL}$ of the carboxylic acid ester having the molecular weight of less than 1000 satisfy the next formula:

$$1 \le (W_{PLH}/W_{PLL}) \le 50.$$

The PSA tape having such a PVC film is likely to combine anti-fogging properties and other properties (e.g. initial adhesive strength and low-temperature properties) at a higher level.

The PVC film constituting the PSA tape disclosed herein preferably comprises an antioxidant. By the use of the antioxidant, the heat resistance of the PVC increases and the condensation amount tends to decrease even at a high temperature.

This description also provides a wire harness that comprises electric wires wrapped with a PSA tape disclosed herein. Such a configuration can bring about good anti-fogging properties in the wire harness.

BRIEF DESCRIPTION OF THE DRAWINGS

FIG. 1 shows a cross-sectional diagram schematically illustrating the constitution of the PSA tape according to an embodiment.

FIG. 2 shows a cross-sectional diagram schematically illustrating the constitution of the PSA tape according to another embodiment.

DETAILED DESCRIPTION OF THE INVENTION

Preferred embodiments of the present invention are described below. Matters necessary to practice this invention other than those specifically referred to in this description can be understood by a person skilled in the art based on the disclosure about implementing the invention in this description and common technical knowledge at the time the application was filed. The present invention can be practiced based on the contents disclosed in this description and common technical knowledge in the subject field.

The PSA tape disclosed herein comprises a PVC film comprising a plasticizer, and a PSA layer placed on one or each face of the PVC film.

<PVC Film>

The PVC film can be obtained by forming a sheet (film) from a PVC composition that comprises prescribed ingredients by a known method. The PVC composition here refers to a composition in which PVC is the primary component (i.e. a component with the highest content, which can be a component accounting for more than 50% by weight). Such a PVC composition can form a PVC film (typically a film formed of a soft PVC resin) that exhibits favorable physical properties as a PSA tape substrate (support substrate). The PVC content in the PVC film is typically greater than 40% by weight, or usually suitably 50% by weight or greater. The art disclosed herein can be preferably practiced in an embodiment where the PVC content in the PVC film is greater than 50% by weight (typically 55% by weight or greater). The PVC content can be 60% by weight or greater.

(PVC)

The PVC constituting the PVC composition can be various types of polymer whose primary monomer (the primary component among monomers, which can be a monomer accounting for more than 50% by weight) is vinyl chloride. In other words, the concept of PVC here encompasses copolymers of vinyl chloride and various comonomers as well as vinyl chloride homopolymer. Examples of the comonomers include vinylidene chloride; olefins such as ethylene and propylene (preferably, olefins with 2 to 4 carbons); carboxy group-containing monomers such as acrylic acid, methacrylic acid (hereinafter, (meth)acryl is used to comprehensively refer to acryl and methacryl), maleic acid and fumaric acid as well as their acid anhydrides (maleic acid anhydride, etc.); (meth)acrylic acid esters, e.g. esters of (meth)acrylic acid and alkyl alcohols or cycloalkyl alcohols with about 1 to 10 carbons; vinyl ester-based monomers such as vinyl acetate and vinyl propionate; styrene-based monomers such as styrene, substituted styrenes (α-methylstyrene, etc.) and vinyl toluene; and acrylonitrile. As the copolymer, a copolymer in which the copolymerization ratio of vinyl chloride is 70% by weight or greater (more preferably 90% by weight or greater) is preferable. The PVC can be obtained by polymerizing these monomers by a suitable method (typically a suspension polymerization method).

The average degree of polymerization of the PVC in the PVC composition can be, but not particularly limited to, for instance, about 800 to 1800. In view of the balance between the workability (such as ease of molding) and the strength, etc., an average degree of polymerization of about 800 to 1600 (e.g. about 900 to 1500) is usually suitable. From the standpoint of reducing the condensation amount, in an embodiment, a PVC with an average degree of polymerization of greater than 1000 (e.g. 1100 or greater, more preferably 1200 or greater) can be preferably used.

(Plasticizer)

As the plasticizer, various materials that are known to plasticize PVC can be used without particular limitations. Examples of the plasticizer include, but not limited to, aromatic carboxylic acid esters such as benzoic acid esters (glycol benzoic acid esters), phthalic acid esters, terephthalic acid esters (di-2-ethylhexyl phthalate, etc.), trimellitic acid esters and pyromellitic acid esters; aliphatic carboxylic acid esters such as adipic acid esters, sebacic acid esters, azelaic acid esters, maleic acid esters and citric acid esters (tributyl acetylcitrate, etc.); polyesters of polycarboxylic acids and polyols; as well as polyether-based polyesters; epoxy-based polyesters (epoxidized vegetable oils such as epoxidized soybean oil and epoxidized linseed oil, epoxidized aliphatic acid alkyl esters, etc.); and phosphoric acid esters (tricresyl phosphate, etc.). For the plasticizer, solely one species or a suitable combination of two or more species can be used.

As the phthalic acid ester (phthalic acid ester-based plasticizer), for instance, a diester of phthalic acid and an alkyl alcohol with 4 to 16 (preferably 6 to 14, typically 8 to 13) carbons can be used. Favorable examples include di-n-octyl phthalate, di-2-ethylhexyl phthalate, diisononyl phthalate and diisodecyl phthalate.

As the trimellitic acid ester (trimellitic acid ester-based plasticizer), for instance, a triester of trimellitic acid and an alkyl alcohol with 6 to 14 (typically 8 to 12) carbons can be used. Favorable examples include tri-n-octyl trimellitate, tri-2-ethylhexyl trimellitate, triisononyl trimellitate, tri-n-decyl trimellitate and triisodecyl trimellitate.

As the pyromellitic acid ester (pyromellitic acid ester-based plasticizer), for instance, a tetraester of pyromellitic acid and an alkyl alcohol with 6 to 14 (typically 8 to 12) carbons can be used. Favorable examples include tetra-n-octyl pyromellitate, tetra-2-ethylhexyl pyromellitate and tetra-n-decyl pyromellitate.

As the adipic acid ester (adipic acid ester-based plasticizer), for instance, a diester of adipic acid and an alkyl alcohol with 4 to 16 (preferably 6 to 14, typically 8 to 13) carbons can be used. Favorable examples include di-n-octyl adipate, di-2-ethylhexyl adipate and diisononyl adipate.

As the polyester (polyester-based plasticizer), for instance, a polyester can be used, which is obtainable from a polycarboxylic acid (e.g. succinic acid, adipic acid, suberic acid, azelaic acid, sebacic acid, citric acid, phthalic acid, isophthalic acid, terephthalic acid, trimellitic acid, etc.) and a polyol (e.g. (poly)ethylene glycol (with the term "(poly) ethylene glycol" here comprehensively referring to ethylene glycol and polyethylene glycol, the same applies hereinafter), (poly)propylene glycol, (poly)butylene glycol, (poly) hexanediol, (poly)neopentyl glycol, polyvinyl alcohol, etc.). As the polycarboxylic acid, an aliphatic dicarboxylic acid with 4 to 12 (typically 6 to 10) carbons is preferable, with favorable examples including adipic acid and sebacic acid. In particular, in view of the availability and cost, adipic acid is desirable. As the polyol, an aliphatic diol with 2 to 10 carbons is preferable, with favorable examples including ethylene glycol and butylene glycol (e.g. 1,3-butanediol, 1,4-butanediol).

The plasticizer content in the PVC film is not particularly limited. For instance, the plasticizer content can be suitably selected so as to obtain desirable plasticizing effects while reducing the condensation amount of the PVC adhesive tape to or below a certain level. Usually, the plasticizer content is suitably 1% by weight or greater (typically 5% by weight or greater, e.g. 10% by weight or greater). From the standpoint of obtaining greater plasticizing effects, it is preferably 15% by weight or greater. The plasticizer content can be 20% by weight or greater, or even 25% by weight or greater (e.g. 30% by weight or greater). The plasticizer content can be, for instance, 60% by weight or less of the PVC film. From the standpoint of reducing the condensation amount, it is usually preferably 50% by weight or less, or more preferably 40% by weight or less. The art disclosed herein can be preferably practiced in an embodiment where the plasticizer content is 35% by weight or less (typically less than 35% by weight, e.g. 33% by weight or less) of the PVC film.

The amount of the plasticizer used relative to 100 parts by weight of PVC is usually, but not particularly limited to, suitably 15 to 75 parts by weight, preferably 20 to 60 parts by weight, or more preferably 30 to 50 parts by weight.

In a preferable embodiment of the art disclosed herein, the PVC film comprises, as the plasticizer, a polyester-based plasticizer of at least 1000 in molecular weight in combination with a carboxylic acid ester of less than 1000 in molecular weight. According to such an embodiment, can be obtained the PVC adhesive tape with good flexibility and condensation amount reduced to or below a certain level.

In general, a polyester-based plasticizer having a molecular weight of 1000 or greater is less susceptible to volatilization (evaporation) even at a high temperature; and therefore, it is suited for reducing the condensation amount (and thus increasing the anti-fogging properties). On the contrary, at a low temperature, the plasticizing effect of the polyester-based plasticizer of 1000 or greater in molecular weight decreases due to the viscosity of the plasticizer itself. Thus, it tends to lack the flexibility required of PVC adhesive tape. On the other hand, while a carboxylic acid ester of less than 1000 in molecular weight is highly effective in bringing about flexibility even at a low temperature, it is susceptible to volatilization at a high temperature, likely causing fogging.

The present inventors have found out that the combined use of a polyester-based plasticizer of at least 1000 in molecular weight (which may be referred to as "PLH" hereinafter) and a carboxylic acid ester of less than 1000 in molecular weight (which may be referred to as "PLL" hereinafter) reduces the volatilization of PLL at a high temperature. They have further found that this effectively reduces the condensation amount in PVC adhesive tape using a PVC film having a composition comprising a plasticizer to bring about good anti-fogging properties. While not wishing to be bound by theory, it may be considered that the intermolecular interaction between PLL and PLH reduces the volatility of PLL. The present inventors have also found that in comparison to an embodiment using a PVC film comprising solely PLL as the plasticizer, temporal changes of adhesive strength (typically lowering of adhesive strength) are reduced in a PSA tape using a PVC film comprising PLL and PLH in combination. This may be that while diffusion (migration) of the PLL into the PSA layer is thought to be one of the causes of temporal changes of adhesive strength, the combined use of the PLL and PLH is thought to inhibit the diffusion of the PLL into the PSA layer probably through the intermolecular interaction between the PLL and PLH as well as the interaction between the PLH and PVC, thereby reducing temporal changes of adhesive strength. Accordingly, the combined use of PLH and PLL can combine anti-fogging properties and other properties at a higher level as compared to an embodiment using solely PLH or PLL.

In this description, with respect to a plasticizer, the "molecular weight" refers to the weight average molecular weight determined based on the "(2-2) Molecular Weight Analysis by GPC" described later.

As the carboxylic acid ester having a molecular weight of less than 1000 (PLL), solely one species or a combination of two or more species can be used among species of less than 1000 in molecular weight that are of aromatic carboxylic acid esters, aliphatic carboxylic acid esters and polyesters as those described above. Examples that can be used include phthalic acid esters (di-n-octyl phthalate, di-2-ethylhexyl phthalate, diisononyl phthalate, diisodecyl phthalate, etc.), adipic acid esters (di-n-octyl adipate, di-2-ethylhexyl adipate, diisononyl adipate, etc.), trimellitic acid esters (tri-n-octyl trimellitate, tri-2-ethylhexyl trimellitate, etc.), pyromellitic acid esters (tetra-n-octyl pyromellitate, tetra-2-ethylhexyl pyromellitate, tetra-n-decyl pyromellitate, etc.), citric acid esters, sebacic acid esters, azelaic acid esters, maleic acid esters and benzoic acid esters.

As the PLL, an aromatic carboxylic acid ester can be preferably used. In particular, an ester derived from a tri-functional or higher (typically tri-functional or tetra-functional) aromatic carboxylic acid is preferable, with specific examples including trimellitic acid esters and pyromellitic acid esters. Such a PLL is likely to exhibit the effect of the intermolecular interaction and is also compatible with PVC. It is also preferable in view that it is less volatile as compared to an ester derived from a mono-functional or di-functional aromatic carboxylic acid.

The molecular weight of the PLL is typically 250 or greater. From the standpoint of reducing the volatilization to reduce the condensation amount, it is preferably 400 or greater, or more preferably 500 or greater. The art disclosed herein can be preferably implemented in an embodiment using a PLL having a molecular weight of 600 or greater (more preferably 650 or greater, e.g. 700 or greater). The maximum molecular weight of the PLL is not particularly limited as long as it is below 1000. Usually, from the standpoint of the handling properties, etc., a PLL having a molecular weight of 950 or less (e.g. 900 or less) can be preferably used.

The number of carbons in the ester residue in the PLL is preferably 6 or greater, or more preferably 8 or greater. Such a PLL is likely to exhibit the effect of the intermolecular interaction. It is also preferable in view that with increasing molecular weight, the volatility tends to decrease. In addition, with increasing molecular chain length, it will have greater flexibility to likely take a liquid form with greater handling properties. The maximum number of carbons in the ester residue is not particularly limited. From the standpoint of the handling properties, compatibility to PVC, etc., it is usually 16 or less, preferably 14 or less, or more preferably 12 or less (e.g. 10 or less). Favorable examples of the ester residue in the PLL include n-octyl group, 2-ethylhexyl group, n-decyl group and isodecyl group. In an embodiment, a PLL in which the ester residue is a branched alkyl group such as 2-ethylhexyl group and isodecyl group can be preferably used.

The amount of PLL (when two or more species are used, their combined amount) added to 100 parts by weight of PVC is, but not particularly limited to, usually less than 75 parts by weight, preferably less than 60 parts by weight, or more preferably less than 50 parts by weight. In view of facilitating the reduction of the condensation amount, the amount of PLL added to 100 parts by weight of PVC is advantageously 30 parts by weight or less, preferably 20 parts by weight or less, or more preferably 15 parts by weight or less. The art disclosed herein can be preferably implemented in an embodiment where the amount of PLL added to 100 parts by weight of PVC is 10 parts by weight or less. The minimum amount of PLL added can be selected so as to obtain desirable flexibility. Usually, to 100 parts by weight of PVC, it is suitably 1 part by weight or greater (preferably 3 parts by weight or greater, e.g. 5 parts by weight or greater).

As the polyester-based plasticizer having a molecular weight of 1000 or greater (PLH), solely one species or a combination of two or more species can be used among species of 1000 or greater in molecular weight that are of polyester-based plasticizers as those described above. From the standpoint of the plasticizing effect and flexibility at low temperatures, a polyester of an aliphatic dicarboxylic acid with 4 to 12 (typically 6 to 10) carbons and a polyol is preferable. Particularly preferable is an adipic acid-based polyester plasticizer obtainable from a dicarboxylic acid comprising adipic acid as the primary component and an aliphatic diol such as neopentyl glycol, propylene glycol and ethylene glycol. This is because such an adipic acid-based polyester plasticizer has a great degree of interaction with the PLL and PVC, which reduces the PLL volatilization and further reduces the volatility of the PLH itself.

Specific examples of commercial products that can be used as the PLH in the art disclosed herein include products of DIC Corporation under product names W-230H, W-1020EL, W-1410EL, W-2050, W-2300, W-2310, W-2360, W-360ELS and W-4010; products of ADEKA Corporation under product names P-300, PN-250, PN-400, PN-650, PN-1030 and PN-1430; products of Kao Corporation under product name HA-5 and the like.

The molecular weight of the PLH is not particularly limited as long as it is 1000 or greater. From the standpoint of reducing the condensation amount, usually, it is advantageous to use a PLH having a molecular weight of 2000 or greater (e.g. 3000 or greater). The art disclosed herein can be preferably implemented in an embodiment using a PLH having a molecular weight of 4000 or greater (e.g. 5000 or greater). The maximum molecular weight of the PLH is not particularly limited, but it is usually suitably less than 100000. From the standpoint of obtaining the plasticizing effect of PVC to a greater extent to readily bring about the flexibility required of the PVC adhesive tape, the molecular weight of the PLH is preferably less than 50000, more preferably less than 25000, or yet more preferably less than 10000 (e.g. 7000 or less).

The amount of PLH (when two or more species are used, their combined amount) added to 100 parts by weight of PVC is, but not particularly limited to, usually suitably less than 75 parts by weight. In view of facilitating the reduction of the condensation amount, it is preferably less than 60 parts by weight, or more preferably less than 50 parts by weight (e.g. less than 45 parts by weight). The minimum amount of PLH added can be selected so as to obtain desirable flexibility. Usually, relative to 100 parts by weight of PVC, it is suitably 5 parts by weight or greater (preferably 8 parts by weight or greater, e.g. 10 parts by weight or greater). The art disclosed herein can also be preferably implemented in an embodiment where the amount of PLH added to 100 parts by weight of PVC is 15 parts by weight or greater, or even 20 parts by weight or greater (e.g. 25 parts by weight or greater, or even 30 parts by weight or greater).

The ratio of the amount of PLH added to the amount of PLL added is not particularly limited. For instance, the PLH weight ($W_{PLH}$) to PLL weight ($W_{PLL}$) ratio (i.e. $W_{PLH}/W_{PLL}$) in the PVC film can be about 0.1 to 500. From the standpoint of reducing the condensation amount, usually, $W_{PLH}/W_{PLL}$ is advantageously 0.5 to 100, or preferably 1 to 50. From the standpoint of combining anti-fogging properties and other properties (reduced temporal changes of adhesive strength (for instance, long-lasting adhesive strength), flexibility over a wide temperature range, etc.) at a higher level, in a preferable embodiment, $W_{PLH}/W_{PLL}$ can be 1 to 25, or it is more preferably 1 to 15 (e.g. 1 to 10), or yet more preferably 1 to 8 (typically 1 to 5).

(Elastomer)

The PVC film in the art disclosed herein may comprise an elastomer in addition to the PVC and plasticizer. The inclusion of the elastomer in the PVC film may bring about effects such as improvement of low-temperature properties (e.g. flexibility at low temperatures) of the PVC adhesive tape and increasing of mechanical strength of the PVC film (e g obtaining desirable mechanical strength even when the PVC film is made thinner).

As the elastomer, various known polymer materials can be used. Non-limiting examples of such elastomer include a chlorinated polyethylene (CPE), ethylene-vinyl acetate copolymer, vinyl chloride-vinyl acetate copolymer (e.g. vinyl chloride-vinyl acetate copolymer with a vinyl acetate content of about 10% by weight or greater, typically about 10 to 25% by weight), (meth)acrylic acid ester-butadiene-styrene copolymer (e.g. methyl methacrylate-butadiene-styrene copolymer), acrylonitrile-butadiene-styrene copolymer, acrylonitrile-butadiene copolymer, styrene-butadiene copolymer (typically styrene-butadiene block copolymer, e.g. styrene-butadiene block copolymer with a styrene content of about 35% by weight or less, typically about 10 to 35% by weight), styrene-butadiene-styrene block copolymer, chlorosulfonated polyethylene (CSM), polyester-based thermoplastic elastomer, thermoplastic polyurethane and other synthetic rubbers (isoprene rubber, butadiene rubber, etc.) as well as composites and modified products of these. For the elastomer, solely one species or a combination of two or more species can be used.

As the elastomer included in the PVC film in the art disclosed herein, it is preferable to select a material that is fairly compatible with PVC. This can effectively increase the low-temperature properties of the PVC film and the PVC adhesive tape using the PVC film. From the standpoint of the appearance of the PVC adhesive tape, etc., the elastomer is preferably used in a range of composition (in a range of amount) that produces a fairly miscible state in the PVC film. The miscible state can be assessed, for instance, by observing the PVC as is or in a stretched state (e.g. stretched in the machine direction to about twice its length) for the presence of clouding.

Non-limiting examples of the elastomer preferably used in the art disclosed herein include a chlorinated polyethylene (e.g. chlorinated polyethylene with a chlorine content of about 25 to 50% by weight, typically about 30 to 45% by weight, preferably about 35 to 45% by weight), (meth)acrylic acid ester-butadiene-styrene copolymer, acrylonitrile-butadiene copolymer (e.g. acrylonitrile-butadiene copolymer with an acrylonitrile content of about 15 to 50% by weight, typically about 25 to 45% by weight, preferably about 30 to 40% by weight), and ethylene-vinyl acetate copolymer (e.g. ethylene-vinyl acetate copolymer with a vinyl acetate content of about 30 to 75% by weight, typically about 40 to 70% by weight, preferably about 50 to 65% by weight).

The elastomer content in the PVC film is not particularly limited and can be selected so as to obtain desirable effects. The elastomer content in the PVC film is usually suitably about 0.5% by weight or greater. From the standpoint of obtaining greater effects, it is preferably about 1% by weight or greater. From the standpoint of the compatibility described above, the elastomer content in the PVC film is usually suitably less than 40% by weight, preferably about 35% by weight or less, or more preferably about 30% by weight or less (e.g. about 25% by weight or less). From the standpoint of facilitating the balance between the effect of the use of elastomer and other properties, the art disclosed herein can be preferably implemented in an embodiment where the elastomer content in the PVC film is about 1 to 20% by weight (typically about 1 to 15% by weight, preferably about 1 to 10% by weight, e.g. about 3 to 8% by weight).

The elastomer content per 100 parts by weight of PVC is not particularly limited and can be, for instance, 0.5 part by weight or greater. It is usually suitably 1 part by weight or greater. From the standpoint of obtaining greater effects, it is preferably 2 parts by weight or greater. From the standpoint of facilitating the balance between the effect of the use of elastomer and other properties, the elastomer content per 100 parts by weight of PVC is usually suitably 40 parts by weight or less, or preferably 30 parts by weight or less. In a preferable embodiment, the elastomer content per 100 parts by weight of PVC can be 3 to 20 parts by weight (e.g. 5 to 15 parts by weight).

(Aliphatic Acid Metal Salt)

The PVC film in the art disclosed herein preferably comprises an aliphatic acid metal salt in addition to the PVC and plasticizer. During processing of the PVC film or the PVC adhesive tape or in a use environment of the PSA tape, the PVC in the PVC film is sometimes exposed to physical energy such as heat, UV rays or shearing force and a chemical reaction occurring upon the exposure may cause discoloration or damage to physical, mechanical or electrical properties. By including the aliphatic acid metal salt in the PVC film, the aliphatic acid metal salt may serve as a stabilizer to prevent or inhibit the chemical reaction. The prevention or inhibition of the chemical reaction (typically hydrochloric acid elimination) may advantageously contribute to reduce the condensation amount measured with respect to the PVC adhesive tape and thus to improve the anti-fogging properties.

As the aliphatic acid metal salt, solely one species or a combination of two or more species can be used among compounds capable of serving as stabilizers of the PVC film. For instance, the aliphatic acid forming the aliphatic acid metal salt can be preferably selected among saturated and unsaturated aliphatic acids (possibly hydroxy aliphatic acids) with about 10 to 20 (typically 12 to 18) carbons, such as lauric acid, ricinoleic acid and stearic acid. From the standpoint of the ease of molding and processing of the PVC film, etc., a stearic acid metal salt can be preferably used. From the standpoint of reducing temporal changes of the PVC film or the PVC adhesive tape or of their flexibility at a low temperature, a lauric acid metal salt can be preferably used. In a preferable embodiment, a stearic acid metal salt and a lauric acid metal salt can be used in combination. In this embodiment, the ratio of the amount of the lauric acid metal salt used to the amount of the stearic acid metal salt used can be, for instance, 0.1 to 10 by weight, or it is usually suitably 0.2 to 5 (typically about 0.5 to 2, e.g. about 0.8 to 1.2).

As the metal forming the aliphatic acid metal salt, in view of the recent increasing concern to environmental health, a metal other than lead (lead-free metal) is preferably used. Even in an embodiment using no such lead-containing stabilizer, the art disclosed herein can provide a PVC adhesive tape that shows good anti-fogging properties. As the metal, a metal can be selected among species belonging to Groups 1, 2, 12, 13 and 14 (but excluding Pb) of the periodic table, with favorable examples including Li, Na, Ca, Mg, Zn, Ba and Sn. As the aliphatic acid metal salt, from the standpoint of the cost, availability, etc., a Ca salt or a Ba salt can be preferably used. From the standpoint of the ease of molding and processing the PVC film, a Zn salt can be preferably used. In a preferable embodiment, a Ca salt and a Zn salt can be used in combination. In this embodiment, the ratio of the amount of the Zn salt used to the amount of the Ca salt used is not particularly limited. For instance, by weight, the ratio value can be 0.1 to 10, or it is usually suitably about 0.2 to 5 (typically about 0.5 to 2, e.g. about 0.8 to 1.2). The art disclosed herein can be preferably implemented, for instance, in an embodiment including calcium stearate and zinc laurate at an aforementioned weight ratio or in an embodiment including zinc stearate and calcium laurate at an aforementioned weight ratio. It can be preferably implemented also in an embodiment comprising solely one species among Ca stearate, Zn stearate, Ca laurate and Zn laurate (e.g. Ca stearate). It is noted that for an application that allows the use of an aliphatic acid Pb salt, the PVC film can comprise an aliphatic acid Pb salt.

The amount of the aliphatic acid metal salt used (when two or more species are used, their combined amount) is not particularly limited. For instance, the aliphatic acid metal salt content can be, for instance, about 0.01% by weight or greater of the PVC film. From the standpoint of obtaining greater effects, the aliphatic acid metal salt content is usually suitably about 0.02% by weight or greater of the PVC film, preferably about 0.05% by weight or greater, or more preferably about 0.08% by weight or greater. The art disclosed herein can also be preferably practiced in an embodiment where the aliphatic acid metal salt content in the PVC film is greater than about 0.10% by weight (typically about 0.12% by weight or greater, e.g. about 0.15% by weight or greater). The upper limit of the aliphatic acid metal salt content is not particularly limited. It is usually suitably about 5% by weigh or less of the PVC film. From the standpoint of the flexibility at low temperatures, etc., it is preferably about 3% by weight or less, or more preferably about 1% by weight or less (typically about 0.5% by weight or less, e.g. about 0.3% by weight or less).

(Antioxidant)

The PVC film in the art disclosed herein, the PVC film may comprise an antioxidant in addition to the PVC and plasticizer. With the inclusion of the antioxidant in the PVC film, for instance, the heat resistance of the PVC film may increase to inhibit degradation (alteration of quality) of the PVC film accompanying formation of decomposition products. This can reduce the increase of the condensation amount caused by volatilization of the decomposition products and thus improve the anti-fogging properties.

As the antioxidant, known materials capable of preventing oxidation can be used without particular limitations. Examples of the antioxidant include phenol-based antioxidants, phosphorous-based antioxidants, sulfur-based antioxidants and amine-based antioxidants. For the antioxidant, solely one species or a combination of two or more species can be used.

Favorable examples of the antioxidant include phenol-based antioxidants such as hindered phenol-based antioxidants. Examples of hindered phenol-based antioxidants include pentaerythritol tetrakis[3-(3,5-di-tert-butyl-4-hydroxyphenyl)propionate] (trade name "IRGANOX 1010" available from Ciba Japan K.K.), octadecyl-3-(3,5-di-tert-butyl-4-hydroxyphenyl)propionate (trade name "IRGANOX 1076" available from Ciba Japan K.K.), 4,6-bis(dodecylthiomethyl)-o-cresol (trade name "IRGANOX 1726" available from Ciba Japan K.K.), triethylene glycol bis[3-(3-tert-butyl-5-methyl-4-hydroxyphenyl)propionate] (trade name "IRGANOX 245" available from Ciba Japan K.K.), bis(2,2,6,6-tetramethyl-4-piperidyl)sebacate (trade name "TINUVIN 770" available from Ciba Japan K.K.) and a polycondensate of dimethyl succinate and 4-hydroxy-2,2,6,6-tetramethyl-1-piperidineethanol (dimethyl succinate-1-(2-hydroxyethyl)-4-hydroxy-2,2,6,6-tetramethylpiperidine polycondensate) (trade name "TINUVIN 622" available from Ciba Japan K.K.). In particular, pentaerythritol tetrakis

[3-(3,5-di-tert-butyl-4-hydroxyphenyl)propionate](trade name "IRGANOX 1010" available from Ciba Japan K.K.), triethylene glycol bis[3-(3-tert-butyl-5-methyl-4-hydroxyphenyl)propionate](trade name "IRGANOX 245" available from Ciba Japan K.K.) and the like are preferable.

The amount of the antioxidant used (when two or more species are used, their combined amount) is not particularly limited. For instance, it can be used in an amount that yields an antioxidant content in the PVC film of about 0.001% by weight or greater. From the standpoint of obtaining greater effects, usually, the antioxidant content in the PVC film is suitably about 0.005% by weight or greater, preferably about 0.01% by weight or greater, or more preferably about 0.05% by weight or greater. In a preferable embodiment, the antioxidant content in the PVC film can be about 0.1% by weight or greater, about 0.5% by weight or greater, or even about 1% by weight or greater (e.g. about 1.5% by weight or greater). The upper limit of the antioxidant content is not particularly limited. Usually, it is suitably about 10% by weight or less (typically about 5% by weight or less, e.g. about 3% by weight or less) of the PVC film.

The PVC film in the art disclosed herein may further comprise as necessary known additives that can be used in PVC film (especially in PVC film for PVC adhesive tapes) as far as the effect of the present invention is not significantly impaired. Examples of such additives include colorant such as pigment and dye, stabilizer other than an aliphatic acid metal salt (e.g. an organic tin compound such as dioctyltin laurate), stabilization-aiding agent (e.g. phosphites such as trialkyl phosphite, inorganic compounds such as hydrotalcite and zeolite), photostabilizer, UV-ray absorber, modifier, flame retardant, antistatic agent, antifungal agent and lubricant. These additives can be used in amounts generally used in the field of PVC film.

The PVC film having such a composition can be obtained typically by molding a PVC composition having the corresponding composition into a film form by a method known in the field of thermoplastic resin film. As such known molding methods, for instance, a melt-extrusion molding method (inflation method, T-die method, etc.), melt casting method, calendering method and the like can be employed. The art disclosed herein can be preferably implemented also in an embodiment using for the PVC film a film that has not been subjected to a treatment to purposefully increase the crosslinking of the overall PVC film, with the treatment including addition of a crosslinking agent and irradiation of active energy rays. With such PVC film, the PVC adhesive tape tends to be obtained with greater flexibility.

As an example, a typical procedure for making a film by a calendering method is outlined below.
(1) Measuring: PVC, plasticizer and other materials used as necessary are weighed out in accordance with the target composition.
(2) Mixing: The respective weighed materials are mixed to prepare a uniform mixture (typically a mixture in a powder form, i.e. a mixed powder).
(3) Kneading: The mixture prepared in (2) above is melted by heat and kneaded with two, three or more kneading rolls (typically metal rolls). It is suitable to set the temperature of the kneading rolls, for instance, at 100° C. to 250° C. (preferably 150° C. to 200° C.).
(4) Calender molding: The kneaded mixture obtained in (3) above is placed in a calender molding machine to mold a PVC film having an arbitrary thickness. The thickness can be controlled by adjusting the gaps between calender rolls and/or the speed ratio among the rolls.

In the PSA tape disclosed herein, the PVC film may constitute the support substrate as a single layer or multiple layers formed from the PVC film, or may constitute the support substrate that comprises other layers in addition to the PVC film. In a preferable embodiment, the other layers may be supplemental layers provided to the PVC film surface, such as a print layer, a release layer and a primer layer. Alternatively, the PVC film may constitute the support substrate in an embodiment where the PVC film and other non-PVC resin film are layered. A preferable embodiment is a configuration where the PSA layer is placed on one face of a support substrate formed of a single PVC film layer.

The thickness of the support substrate is not particularly limited. The thickness of the support substrate (e.g. support substrate formed of a single PVC film layer) is typically 500 µm or less, or usually 300 µm or less. From the standpoint of the handling properties of the PVC adhesive tape, etc., it is preferably 200 µm or less, or more preferably 150 µm or less and it can be, for example, 120 µm or less. The thickness of the support substrate is typically 10 µm or greater, or usually 25 µm or greater. From the standpoint of the strength and handling properties, it is preferably 50 µm or greater, or more preferably 60 µm or greater (e.g. 75 µm or greater). For example, the thickness of the support substrate can be preferably applied to PSA tapes used for protecting and binding electric wires, pipes and the like; covering corrugated tubes that wrap and protect electric wires and the like; covering several bundled electric wires (an electric wire bundle); electric insulation; and so on.

Of the support substrate, the surface to which the PSA layer is placed may be subjected as necessary to heretofore known surface treatments such as corona discharge treatment, plasma treatment, UV-ray irradiation, acid treatment, alkali treatment, primer coating and antistatic treatment. These treatments may be provided to increase the tightness of adhesion between the substrate and PSA layer, that is, the anchoring of the PSA layer to the substrate. The primer composition is not particularly limited and can be suitably selected from known compositions. The thickness of the primer layer is not particularly limited. It is usually preferably 0.01 µm or greater, but 1 µm or less, or more preferably 0.1 µm or greater, but 1 µm or less.

In the PVC adhesive tape having a PSA layer only on one surface of the support substrate, for purposes such as increasing the printability, reducing the light reflection and increasing the ease of application in layers, the face (back face) to which the PSA layer is not placed may be subjected to treatments such as corona discharge treatment, plasma treatment, UV-ray irradiation, acid treatment and alkali treatment. The back face of the PVC adhesive tape may be subjected as necessary to heretofore known surface treatments such as release treatment and antistatic treatment. For instance, the back face of the substrate may be provided with a release layer such as long-chain alkyl-based release layer or silicone-based release layer to reduce the unwinding force of the PVC adhesive tape wound in a roll. The PVC adhesive tape disclosed herein can be preferably made in an embodiment where the back face of the PVC adhesive tape has not been subjected to such a release treatment.

<PSA Layer>

The PSA layer in the art disclosed herein is a layer formed from a material that exists as a soft solid (a viscoelastic material) in a room temperature range and has a property to adhere easily to adherend with some pressure applied. As defined in "*Adhesion: Fundamental and Practice*" by C. A. Dahlquist (McLaren & Sons (1966), P. 143), the PSA referred to herein is normally a material that has a property satisfying complex tensile modulus E*(1 Hz)<10⁷ dyne/cm² (typically, a material that exhibits the described characteristics at 25° C.).

The PSA layer in the art disclosed herein may be formed from a PSA composition in various forms, such as a water-dispersed PSA composition, aqueous PSA composition, solvent-based PSA composition, hot-melt PSA composition and active energy ray-curing PSA composition. Here, the term "active energy ray" refers to an energy ray having energy capable of causing a chemical reaction such as polymerization, crosslinking and initiator decomposition, with the concept thereof encompassing lights such as UV rays, visible lights and infrared lights as well as radioactive rays such as α rays, β rays, γ rays, electron beam, neutron radiation and X rays. A PSA layer formed from a water-dispersed PSA composition is preferable because it is likely to reduce diffusion of the plasticizer in the PVC film into the PSA layer and inhibit temporal changes of adhesive strength, etc.

The type of PSA constituting the PSA layer is not particularly limited. The PSA may comprise as its base polymer (the primary component among polymers) one, two or more species among various rubbery polymers known in the PSA field, such as rubber-based polymers, acrylic polymers, polyester-based polymers, urethane-based polymers, polyether-based polymers, silicone-based polymers, polyamide-based polymers and fluorine-based polymers. Here, the rubber-based PSA refers to a PSA that comprises a rubber-based polymer as the base polymer. The same applies to the acrylic PSA and other PSA. The acrylic polymer refers to a polymer that comprises a monomeric unit derived from an acrylic monomer (a monomer having at least one (meth) acryloyl group per molecule) and typically refers to a polymer that comprises a monomer unit derived from an acrylic monomer at a ratio above 50% by weight. The (meth)acryloyl group comprehensively refers to the acryloyl group and methacryloyl group.

As the PSA layer of the PVC adhesive tape disclosed herein, a PSA layer comprising a rubber-based PSA as the primary component (i.e. a rubber-based PSA layer) can be preferably used. The rubber-based PSA may comprise one, two or more species of rubber-based polymer selected from natural and synthetic rubbers. In this description, the "primary component" refers to a component that accounts for the highest content, typically more than 50% by weight, unless otherwise indicated. As the rubber-based polymer, either natural rubber or synthetic rubber can be used. As the natural rubber, known materials usable in PSA compositions can be used without particular limitations. The concept of natural rubber referred to here is not limited to unmodified natural rubbers, encompassing modified natural rubbers that have been modified with, for instance, an acrylic acid ester, etc. Unmodified and modified natural rubbers may be used together. As the synthetic rubber, known materials that can be used in PSA compositions can be used without particular limitations. Favorable examples include styrene-butadiene rubber (SBR), styrene-isoprene rubber and chloroprene rubber. These synthetic rubbers can be unmodified or modified (e.g. carboxy-modified). For the rubber-based polymer, solely one species or a combination of two or more species can be used.

The PVC adhesive tape according to a preferable embodiment may have a rubber-based PSA layer formed from a water-dispersed rubber-based PSA composition obtained by adding a tackifier resin and other additives as necessary to rubber-based latex. The rubber-based latex can be a water dispersion of various known rubber-based polymers. Either natural rubber latex or synthetic rubber latex can be used. As the natural rubber latex, known materials that can be used in PSA compositions can be used without particular limitations. The concept of natural rubber latex referred to here is not limited to unmodified natural rubber latexes, encompassing modified natural rubber latexes that have been modified with, for instance, an acrylic acid ester, etc. Unmodified and modified natural rubber latexes may be used together. As the synthetic rubber latex, known materials that can be used in PSA compositions can be used without particular limitations. Favorable examples include styrene-butadiene rubber latex (SBR latex), styrene-isoprene rubber latex and chloroprene rubber latex. These synthetic rubber latexes can be unmodified or modified (e.g. carboxy-modified). For the rubber-based latex, solely one species or a combination of two or more species can be used.

The rubber-based PSA composition (e.g. water-dispersed, rubber-based PSA composition) according to a preferable embodiment comprises both a natural rubber and a synthetic rubber as the rubber-based polymer. With such a PSA composition, the PVC adhesive tape can be formed to show good adhesive properties. For instance, the PVC adhesive tape can be formed to show adhesive properties suited for applications such as protection and binding of electric wires, pipes and the like, covering of corrugated tubes as described above, covering of electric wire bundles and electric insulation. The natural rubber to synthetic rubber weight ratio (natural rubber:synthetic rubber) is preferably in a range of about 10:90 to 90:10, more preferably in a range of about 20:80 to 80:20, or yet more preferably in a range of about 30:70 to 70:30. As the synthetic rubber, SBR can be preferably used.

The PSA layer (typically a rubber-based PSA layer) in the art disclosed herein may comprise a tackifier resin in addition to the base polymer as described above. As the tackifier resin, a suitable species can be selected and used among various known tackifier resins. For example, one, two or more species can be used, selected from various tackifier resins including rosin-based resins, petroleum-based resins, terpene-based resins, phenolic resins, coumarone-indene-based resins and ketone-based resins.

Examples of rosin-based resins include rosin derivatives such as disproportionated rosins, hydrogenated rosins, polymerized rosins, maleinated rosins and fumarated rosins as well as phenol-modified rosins and rosin esters. Examples of phenol-modified rosins include products of addition reactions of natural rosins or rosin derivatives and phenols, and phenol-modified rosins obtainable by reactions of resolic phenol resins and natural rosins or rosin derivatives. Examples of rosin esters include esterified products of the rosin-based resins reacted with polyols. Rosin-phenol resins can be esterified as well.

Examples of terpene-based resins include terpene resins (α-pinene resins, β-pinene resins, limonene resins, etc.), terpene phenol resins, aromatic modified terpene resins and hydrogenated terpene resins.

Examples of petroleum-based resins include aliphatic (C5) petroleum resins, aromatic (C9) petroleum resins, aliphatic/aromatic copolymer-based (C5/C9) petroleum resins, hydrogenated products of these (e.g. alicyclic petroleum resins obtainable by hydrogenating aromatic petroleum resins) and various modified products thereof (e.g. maleic acid anhydride modified product).

Examples of phenolic resins include condensation products of formaldehyde and various phenols such as phenol, m-cresol, 3,5-xylenol, p-alkylphenol and resorcinol. Other examples of phenolic resins include resoles obtainable by base-catalyzed addition reactions of the phenols and formaldehyde, and novolacs obtainable by acid-catalyzed condensation reactions of the phenols and formaldehyde.

Examples of coumarone-indene-based resins include coumarone-indene resin, hydrogenated coumarone-indene resin, phenol-modified coumarone-indene resin and epoxy-modified coumarone-indene resin.

Examples of ketone resins include ketone resins formed by condensation of formaldehyde and ketones (e.g. aliphatic ketones such as methyl ethyl ketone and methyl isobutyl ketone; aromatic ketones such as acetophenone; and alicyclic ketones such as cyclohexanone and methyl cyclohexanone).

The softening point of the tackifier resin used is not particularly limited. For instance, a tackifier resin having a softening point of 60° C. to 160° C. can be used. A tackifier resin that is in a liquid state at room temperature can be used as well. From the standpoint of combining cohesion and low-temperature properties (e.g. unwinding force and adhesive strength at low temperatures) at a good balance, a tackifier resin having a softening point of about 60° C. to 140° C. (more preferably about 80° C. to 120° C.) can be preferably used. For instance, a petroleum-based resin having a softening point in this range is preferably used. The softening point of a tackifier resin can be measured based on the softening point test method (ring and ball method) specified in JIS K2207.

The ratio of the polymers to the tackifier resin in the PSA layer is not particularly limited and can be suitably selected in accordance with the application. Based on non-volatiles, the tackifier resin content per 100 parts by weight of polymers can be, for instance, about 20 parts by weight or greater, or it is usually suitably about 50 parts by weight or greater. From the standpoint of obtaining greater effects of its use, the amount of the tackifier resin used to 100 parts by weight of polymers can be about 80 parts by weight or greater, or even about 100 parts by weight or greater. On the other hand, from the standpoint of the low-temperature properties, etc., the amount of the tackifier resin used to 100 parts by weight of polymers is suitably about 200 parts by weight or less, or preferably about 150 parts by weight or less.

As for other components, the PSA layer may comprise as necessary various additives generally used in the PSA field, such as viscosity modifier (thickener, etc.), leveling agent, plasticizer, softener, filler, colorant such as pigment and dye, photostabilizer, anti-aging agent, antioxidant, waterproofing agent, antistatic agent, foaming agent, anti-foaming agent, surfactant, preservative and crosslinking agent.

The PSA layer can be formed by suitably employing various heretofore known methods. For instance, it is possible to employ a direct method where a PSA composition is directly provided (typically applied) to a substrate (typically a PVC film) as described above and allowed to dry to form a PSA layer. A transfer method can also be used where a PSA composition is provided to a releasable surface (release face) and allowed to dry to form a PSA layer on the surface, and the PSA layer is transferred to a substrate. These methods can be combined as well. As the release face, a release liner surface, the support substrate's back face treated with a release agent, and the like can be used.

The PSA composition can be applied with a known or commonly-used coater such as a gravure coater, reverse roll coater, kiss roll coater, dip roll coater, bar coater, knife coater and spray coater. The PSA layer is typically formed continuously. Depending on the purpose and application, it may be formed in a regular or random pattern of dots, stripes, etc.

The thickness of the PSA layer is, but not particularly limited to, typically 2 μm to 150 μm, usually suitably 5 μm to 100 μm, preferably 10 μm to 80 μm, or more preferably 10 μm to 50 μm (e.g. 15 μm to 40 m). The thickness range of the PSA layer can be preferably applied to PVC adhesive tapes used for protecting and binding electric wires, pipes and the like, covering corrugated tubes as described above, covering electric wire bundles, electric insulation and so on.

<PSA Tape>

FIG. 1 shows a configurational example of the PSA tape disclosed herein. PVC adhesive tape 1 shown in FIG. 1 is constituted as a single-faced PSA tape that comprises a support substrate (e.g. a mono-layer PVC film) 11 having a first face 11A and a second face 11B, and a PSA layer 21 placed on the first face 11A. In a preferable embodiment, for instance, as shown in FIG. 1, PSA tape 1 before used (i.e. before adhered to adherend) may be in a PSA tape roll form where it is wound in the length direction so that the second face 11B of the support substrate is in contact with the PSA layer 21 to protect its surface (adhesive face) 21A. Alternatively, it may be in a form where the surface 21A of the PSA layer 21 is protected with a release liner having a release face at least on the side that faces the PSA layer 21. As the release liner, a known or commonly-used liner can be used without particular limitations. For instance, can be used a release liner having a release layer on a surface of a substrate such as plastic film and paper, a release liner formed from a low adhesive material such as fluorine-based polymers (polytetrafluoroethylene, etc.) and polyolefin-based resins (polyethylene, polypropylene, etc.), and the like.

FIG. 2 shows another configurational example of the PSA tape disclosed herein. PSA tape 2 shown in FIG. 2 is constituted as a double-faced PSA tape having a first PSA layer 21 and a second PSA layer 22 placed on the first face 11A and second face 11B of support substrate (e.g. a mono-layer PVC film) 11, respectively. The art disclosed herein can be preferably implemented also in an embodiment of such a double-faced PSA tape.

The PSA tape disclosed herein typically yields a condensation amount of 5 mg or less when measured by the following method. By limiting the condensation amount to or below 5 mg, even when the plasticizer-containing PVC film is used, good anti-fogging properties tend to be obtained. From such a standpoint, the condensation amount of the PSA tape is preferably 4 mg or less, or more preferably 3 mg or less (e.g. 2.5 mg or less). From the standpoint of the fogging reduction, the closer the condensation amount is to zero, the more advantageous the PSA tape is. Thus, the lower limit of the condensation amount is not particularly limited. From the standpoint of combining anti-fogging properties and other properties (low-temperature properties, etc.) at a high level, the PSA tape disclosed herein can be preferably made in an embodiment where the condensation amount is 0.1 mg or greater, or 0.5 mg or greater (e.g. 1 mg or greater).

(Measurement Method for Condensation Amount)

The condensation amount is measured based on German industrial standard DIN 75201-W. In particular, a piece of the PSA tape having an area equivalent to a circle of 80 mm diameter is applied over its adhesive layer surface (adhesive face) to aluminum foil. The resultant (for double-faced PSA tape with adhesive faces on both sides, each adhesive face is applied to aluminum foil) is placed at the inner bottom of a beaker heated in oil bath at 120° C. (a beaker of 90 mm outer diameter, 83.6 mm inner diameter and 190 mm height immersed to 130 mm depth in the oil bath at 120° C.), with the aluminum foil-side up. An aluminum plate (Al plate)

constantly cooled to 21° C. is further placed on the top opening of the beaker. After left standing in this state for 16 hours, the Al plate is measured for weight (final (post-test) Al plate weight) W1. The initial (pre-test) weight W0 of the Al plate should be measured in advance. Condensation amount (mg) is determined by the following equation (I):

$$\text{Condensation amount (mg)}=W1-W0 \tag{I}$$

The anti-fogging properties can be evaluated by the degree of fogging (%) measured by the following method. A larger value of fogging degree (%) means less fogging (clouding) of the glass plate. Thus, it can be said that the larger the value of fogging degree (%) is, the higher the anti-fogging properties are.

(Measurement Method for Degree of Fogging)

The measurement is carried out based on German industrial standard DIN 75201-R. In particular, a piece of the PSA tape having an area equivalent to a circle of 80 mm diameter is applied over its adhesive layer surface (adhesive face) to aluminum foil. The resultant (for double-faced PSA tape with adhesive faces on both sides, each adhesive face is applied to aluminum foil) is placed at the inner bottom of a beaker heated in oil bath at 120° C. (a beaker of 90 mm outer diameter, 83.6 mm inner diameter and 190 mm height immersed to 130 mm depth in the oil bath at 120° C.), with the aluminum foil-side up. A glass plate constantly cooled to 21° C. is further placed on the top opening of the beaker. After left standing in this state for 3 hours, the glass plate is removed. With respect to the glass plate surface that had faced the inside of the beaker, the reflectance of a beam incident at 600 (or the "60°-incidence reflectance" hereinafter) R1(%) is determined by the next equation: Post-test 60°-incidence reflectance of glass plate R1(%)=(intensity of incident beam to post-test glass plate)/(intensity of reflection from post-test glass plate)×100. The initial 60°-incidence reflectance R0(%) of the glass plate surface prior to the test 600 should be determined in advance by the next equation: 60°-incidence reflectance R0(%) of initial (pre-test) glass plate=(intensity of incident beam to pre-test glass plate)/(intensity of reflection from pre-test glass plate)×100. For the measurement of incidence reflectance (%), for instance, a gloss meter under model name "GM-268 plus" available from Konica Minolta can be used. The degree of fogging (%) can be determined by the following equation (II):

$$\text{Degree of fogging (\%)}=(R1/R0)\times 100 \tag{II}$$

The degree of fogging of the PSA tape disclosed herein can be, but not particularly limited to, for instance, 60% or greater (typically 65% or greater). The PSA tape has a degree of fogging of preferably 70% or greater, or more preferably 75% or greater. According to an embodiment of the art disclosed herein, the PSA tape can be provided with a degree of fogging of 80% or greater (e.g. 85% or greater). The maximum degree of fogging is not particularly limited although it is usually 100% or less.

Although not particularly limited to this, the PSA tape disclosed herein preferably has a holding power of 50 minutes or greater when measured by the method described below. The PSA tape having such holding power has suitable cohesion and thus provides good handling properties during manufacturing and use. From such a standpoint, the holding power of the PSA tape is more preferably 90 minutes or greater, or yet more preferably 120 minutes or greater (e.g. 150 minutes or greater).

(Measurement Method for Holding Power)

Holding power is measured based on the method described in JIS Z0237:2009. In detail, the PSA tape is left standing still at room temperature (23° C.±2° C.) and then cut to a 10 mm wide by 100 mm long size. To inhibit elongation of the support substrate upon application of a load described later, to the back face of the PSA tape, a commercial single-faced PSA tape in the same size is adhered for backing to prepare a measurement sample. As the commercial single-faced PSA tape, a single-faced tape suited for inhibiting elongation of the support substrate corresponding to the load can be selected. For instance, product name "No. 31B" (a single-faced PSA tape having a 25 μm thick polyester film as the support substrate) available from Nitto Denko Corporation can be favorably used. The measurement sample is press-bonded at a short side end to a Bakelite plate (5 mm thick, 25 mm wide, 100 mm long) over a 10 mm wide by 20 mm long bonding area with a 2 kg roller moved back and forth once. A 300 g weight is attached to the other short side end of the measurement sample and the measurement sample is horizontally stored in an environment at 40° C. for 30 minutes. Subsequently, in the same environment at 40° C., the Bakelite plate is held vertically with the weight at the bottom so that the 300 g load is applied to the measurement sample bonded to the Bakelite plate. It is left in this state and the time (minutes) required for the measurement sample to peel off the Bakelite plate is measured. The holding power is indicated by the measured time.

<Analysis>

The composition of the PVC adhesive tape or the PVC film constituting the adhesive tape in the art disclosed herein can be analyzed by general analytical methods commonly used for chemical analysis. Specifically, by suitably combining and using analytical devices and methods according to technical literatures related to analytical chemistry, the respective chemical species can be identified, and their mixed amounts and ratio as well as their molecular weights can be determined. Favorable examples of analytical methods for the PVC adhesive tape and the PVC film disclosed herein are described more in detail below, but these do not limit the scope of the invention.

(1) Analytical Methods (1-1) Preparation of Specimens for Analysis

Specimen(s) used for analysis can be obtained in accordance with the analytical method and the purpose of the analysis, with these specimens including a PVC adhesive tape, PVC film prior to use in manufacturing of the PVC adhesive tape, the respective solid specimens obtained by separating the PSA tape into its support substrate (typically a PVC film) and PSA, etc., and samples prepared by suitably processing these. A favorable example of the method for separating the PVC adhesive tape into its support substrate and PSA is described later.

If a liquid sample is required for analysis, for instance, a suitable solvent is added to the specimen and the mixture is stirred and/or heated as necessary to dissolve the components to be analyzed into the solvent (typically to extract the components from the specimen) to obtain the liquid sample. As the solvent, in view of the polarity, etc., a single solvent or a solvent mixture of two or more kinds of solvent at an arbitrary ratio can be used, selected among chloroform ($CHCl_3$), methylene chloride ($CH_2Cl_2$), tetrahydrofuran (THF), acetone, dimethyl sulfoxide (DMSO), N,N-dimethylformamide (DMF), methanol, ethanol, toluene, water and so on.

A liquid sample can be obtained typically as follows: To about 0.2 g of a specimen (solid content), about 30 mL of a solvent is added; the resulting mixture is stirred in a temperature range from room temperature to approximately the boiling point of the solvent for about 30 minutes to 12 hours to extract the components of the specimen into the solvent; and the resulting solution (extract) is collected in a fraction. As necessary, for instance, when the extraction of the components to be analyzed gives a low yield, etc., a liquid sample can be prepared by repeating the following procedure once or multiple times: To the sample after the fraction is collected, the solvent is newly added in an amount approximately equal to the amount of the fraction; the resultant is stirred; and the resulting solution is collected in a fraction.

When it is necessary to adjust the concentration of the components to be analyzed in the liquid sample thus obtained, or when it requires a liquid sample of the components to be analyzed dissolved in a solvent having a composition different from that of the solvent used in the extraction, after some or all of the solvent in the liquid sample is evaporated, a solvent can be added with its composition and amount being in accordance with the purpose so as to prepare a liquid sample having a desirable concentration and solvent composition.

When insoluble components need to be removed from the liquid sample, it can be filtered through filter paper or a membrane filter to obtain a liquid sample free of the insoluble components.

When it is necessary to obtain a liquid sample containing only a few components (typically one, or about two to five specific components) of the original liquid sample which comprises several components, the target (final) liquid sample can be obtained by purification or isolation by column chromatography according to the reference documents listed below as well as by high pressure liquid chromatography (HPLC) or gel permeation chromatography (GPC) described later.

REFERENCE DOCUMENTS

The following documents are all in the 5th Series of Experimental Chemistry, edited by Chemical Society of Japan and printed by Maruzen Co., Ltd.:
Volume 8, "NMR. ESR" (published 2006)
Volume 9, "Structures of Substances I" (published 2005)
Volume 10, "Structures of Substances II" (published 2005)
Volume 20-1, "Analytical Chemistry" (published 2007)
Volume 20-2, "Environmental Chemistry" (published 2007)
Volume 26, "Polymer Chemistry" (published 2005)
(1-2) Method for Separating PVC Adhesive Tape into Support Substrate and PSA The method for separating the PVC adhesive tape into its support substrate and PSA is not particularly limited. In a simple and convenient method, the PVC adhesive tape is folded with the PSA layer on the inside so that two opposing segments of the PSA layer are bonded together and then the folded PSA adhesive tape is unfolded so that the first segment of the PSA layer on one side of the fold is transferred onto the second PSA layer segment on the other side of the fold. By transferring the first PSA layer segment onto the second PSA layer segment, the PSA layer can be removed from the support substrate on the first side. The PSA layer folded into two layers on the other side can be further layered as necessary by repeating the folding and unfolding procedure in the same manner. This method can separate the support substrate and the PSA by means of bonding the PSA to itself without the use of an organic solvent, heating, etc. Thus, the composition of the PSA tape can be analyzed with good precision. A skilled person in the field can suitably set the conditions such as the time from the bonding of the PSA layer to itself to the peeling as well as the rate and angle of peeling so as to facilitate the transfer of the PSA layer. Alternatively, instead of folding a piece of the PVC adhesive tape, the PSA layers of two pieces of the PVC adhesive tape can be bonded together and then peeled to transfer the PSA layer of the first piece of the PSA tape onto the second piece of the PSA tape.

(1-3) Fourier Transform Infrared Spectroscopy (FT-IR)

FT-IR analysis of the aforementioned solid specimen or a solid specimen obtained by removing the solvent from the aforementioned liquid sample can be carried out by an ATR method with the following device under the conditions shown below. By this analytical method, solely or in combination with other analytical methods, the composition of the components in the PVC adhesive tape or its PSA layer can be identified and the compositional ratio can be determined.

(Device and Conditions)
Device: Thermo Fisher Scientific Inc., NICOLET 6700
Conditions: single reflection ATR method (Smart iTR, Ge45°)
Resolution: 4 $cm^1$
Detector: DTGS
Number of scans: 64

(1-4) Fourier Transform Nuclear Magnetic Resonance Spectroscopy (FT-NMR)

The aforementioned solid specimen or a solid specimen obtained by removing the solvent from the aforementioned liquid sample can be dissolved in a certain deuterated solvent ($CDCl_3$, $CDCl_2$, THF-d8, acetone-d6, DMSO-d6, DMF-d7, methanol-d4, ethanol-d6, $D_2O$, etc.) and subjected to FT-NMR analysis ($^1$H-NMR and/or $^{13}$C-NMR) with the following device under the conditions shown below. For the analysis, a sample having a concentration adjusted to have 0.1 g of the solid specimen in 0.06 mL to 6 mL of the deuterated solvent can be used. By this analytical method, solely or in combination with other analytical methods, the composition of the components in the PVC adhesive tape or its PSA layer can be identified and the compositional ratio can be determined.

(Device and Conditions)
Device: Bruker Biospin, AVANCE III-600 with Cryo Probe
Observed frequency: 600 MHz ($^1$H), 150 MHz ($^{13}$C)
Measurement temperature: 300 K (1-5) Gas Chromatography/Mass Spectrometry (GC/MS)

GC/MS analysis of the aforementioned liquid sample can be carried out with the device and under the conditions shown below. For the liquid sample, the concentration is suitably adjusted to have 0.1 g of the solid specimen in 0.6 mL to 60 mL of the solvent and the resultant can be used as the analytical sample. By this analytical method, solely or in combination with other analytical methods, the composition of the components in the PVC adhesive tape or its PSA layer can be identified and the compositional ratio can be determined. Among the peaks that appear in the chromatogram, with respect to a peak for whose component has been identified, a standard curve can be prepared with the standard being the identified substance or a compound having a molecular structure comparable to the identified substance to determine the amount of the identified component in the sample.

(Device and Conditions)
Device: Thermo Finnigan, TRACE GC ULTRA (GC), POLARIS Q (MS)
GC conditions:
  Column: ULTRA ALLOY-5 (0.25 μm, 00.25 mm×30 m)
  Carrier gas: He (1.0 mL/min)

Injection port: split (split ratio 50:1)
Injection port temperature: 250° C.
Column temperature: 40° C. (3 min)→(+20° C./min)→300° C. (24 min)
MS Conditions:
  Ionization method: EI, FI or CI suitably selected
  Electron energy: 70 eV
  Ion source temperature: 210° C.
  Interface temperature: 300° C.
  Mass range: m/z=20 to 800

(1-6) Gas Chromatography (GC)

GC of the aforementioned liquid sample can be carried out with the following device under the conditions shown below. For the liquid sample, the concentration is suitably adjusted to have 0.1 g of the solid specimen in 0.6 mL to 60 mL of the solvent and the resultant can be used as the analytical sample. By this analytical method, solely or in combination with other analytical methods, the composition of the components in the PVC adhesive tape or its PSA layer can be identified and the compositional ratio can be determined. Among the peaks that appear in the chromatogram, with respect to a peak whose component has been identified, a standard curve can be prepared with the standard being the identified substance or a compound having a molecular structure comparable to the identified substance to determine the amount of the identified component in the sample.

(Device and Conditions)
Device: Agilent Technologies, 6890 Plus
Column: HP-1, 30 m×0.250 mm id×1.0 μm film thickness
Column temperature: 100° C.→(+20° C./min)→300° C. (Hold)
Column pressure: 101.7 kPa (constant flow mode)
Carrier gas: He (1.0 mL/min)
Injection port: split (split ratio 20:1)
Injection port temperature: 250° C.
Detector: FID
Detector temperature: 250° C.
Injection volume: 1 μL (1-7) Liquid Chromatography/Fourier Transform Mass Spectrometry (LC/FT-MS)

LC/FT-MS analysis of the aforementioned liquid sample can be carried out with the following device under the conditions shown below. For the liquid sample, the concentration is suitably adjusted to have 0.1 g of the solid specimen in 0.6 mL to 60 mL of the solvent and the resultant can be used as the analytical sample. By this analytical method, solely or in combination with other analytical methods, the composition of the components in the PVC adhesive tape or its PSA layer can be identified and the compositional ratio can be determined. Among the peaks that appear in the chromatogram, with respect to a peak whose component has been identified, a standard curve can be prepared with the standard being the identified substance or a compound having a molecular structure comparable to the identified substance to determine the amount of the identified component in the sample.

(Device and Conditions)
Device: Thermo Fisher Scientific, ULTIMATE 3000 (LC), LTQ ORBITRAP XL (FT-MS)
LC Conditions:
  Column: Agilent Technologies, ZORBAX ECLIPSE PLUS C8 (03.0 mm×100 mm, 1.8 μm)
  Eluent composition: ACN (acetonitrile)/aqueous ammonium acetate gradient
  Flow rate: 0.5 mL/min
  Column temperature: 40° C.
  Injection volume: 5 μL FT-MS Conditions:
  Ionization method: ESI (Negative, Positive)
  Ion spray voltage: 3 kV (1-8) High Pressure Liquid Chromatography (HPLC)

HPLC of the aforementioned liquid sample can be carried out with the following device under the conditions shown below. For the liquid sample, the concentration is suitably adjusted to have 0.1 g of the solid specimen in 0.6 mL to 60 mL of the solvent and the resultant can be used as the analytical sample. By this analytical method, solely or in combination with other analytical methods, the composition of the components in the PVC adhesive tape or its PSA layer can be identified and the compositional ratio can be determined. Among the peaks that appear in the chromatogram, with respect to a peak whose component has been identified, a standard curve can be prepared with the standard being the identified substance or a compound having a molecular structure comparable to the identified substance to determine the amount of the identified component in the sample. The eluted substances corresponding to the peaks that appear in the chromatogram can be collected in fractions to isolate the components of the PSA tape, separately or as a mixture having a simplified composition and the isolated components can be used as analytical samples in other analyses.

(Device and Conditions)
Device: Agilent Technologies, 1100
Column: INERTSIL C8-4 (04.6 mm×150 mm, 5 μm)
Eluent composition: distilled water/acetonitrile gradient
Flow rate: 1.0 mL/min
Detector: DAD (190 nm to 400 nm, detected at 230 nm)
Column temperature: 40° C.
Injection volume: 10 μL (1-9) Gel Permeation Chromatography (GPC)

GPC of the aforementioned liquid sample can be carried out with the following device under the conditions shown below. For the liquid sample, the concentration is suitably adjusted to have 1 mg of the solid specimen in 0.1 mL to 10 mL of the solvent and the resultant can be used as the analytical sample. The analytical sample is filtered with a suitable filter (e.g. a membrane filter of about 0.45 μm in average pore diameter) and then injected into the device. By this analysis, the molecular weights of the peaks that appear in the chromatogram can be determined as the values based on standard polystyrenes listed below. The eluted substances corresponding to the peaks that appear in the chromatogram can be collected in fractions to isolate the components of the PSA tape, separately or as a mixture having a simplified composition and the isolated components can be used as analytical samples in other analyses.

(Device and Conditions)
Device: Tosoh Corporation, HLC-8120GPC
Pump: Enshine Scientific Corporation, CO-150
Pump flow rate: 1 mL/min
Column: Tosoh corporation; HXL Guard Column, TSK gel G4000 HXL, TSK gel G5000 HXL and TSK gel GMHXL mixed-bed connected for use
Column oven temperature: 40° C.
Detector: Shimadzu Corporation, refractive index detector RID-10A
Eluent: THF
Injection volume: 100 μL
Standard polystyrenes: Tosoh Corporation, Tsk gel standard polystyrenes F-288, F-40, F-4, A-5000, A-500

(2) Analysis of Plasticizer (2-1) Quantitative Analysis by $^1$H-NMR

From the PVC adhesive tape, PSA is removed by the method (1-2) described above and 0.2 g of the support substrate (typically a PVC film) obtained thereby is suspended in 30 mL of chloroform. After stirring this at room temperature for 30 minutes, the solution is collected in a fraction. The procedure of immersing the support substrate in 30 mL of fresh chloroform followed by stirring and then collecting the solution in a fraction is repeated twice. 90 mL of a chloroform solution containing plasticizer extracted from the support substrate is thus collected. To the solid content obtained by evaporating chloroform from the solution, $CDCl_3$ is added to a concentration indicated in (1-4) above.

$^1$H-NMR analysis is carried out with the device and under the conditions described in (1-4) above. Based on the resulting spectrum and the data obtained by other analytical methods, the peak of the plasticizer is determined. From the integration ratio of the peaks, the plasticizer is quantified. When two or more species of plasticizer are contained in the analytical sample, each plasticizer is quantified in the same manner. When the peak of a certain plasticizer overlaps with the peak of another component (a different plasticizer or a non-plasticizer component), the plasticizer is quantified from the integration ratio after subtracting the contribution of the other component.

(2-2) Molecular Weight Analysis by GPC

By the same procedure as (2-1) above, 90 mL of a chloroform solution containing plasticizer extracted from the support substrate is collected. The same chloroform solution collected in (2-1) can also be used for this analysis. To the solid residue obtained by evaporating chloroform from the solution, THF is added to a concentration indicated in (1-9) to obtain an analytical sample.

The analytical sample is analyzed with the device and under the conditions described in (1-9) above to obtain a chromatogram. Based on the chromatogram obtained and the data obtained by other analytical methods, the peak of the plasticizer is identified in the chromatogram. With the baseline connecting the peak's start and end points (around where the peak starts to rise and where the peak subsides), the molecular weight of the plasticizer is determined. When two or more species of plasticizer are contained in the analytical sample, the molecular weight of each plasticizer is determined in the same manner.

(2-3) Amounts of PLH and PLL Added and their Ratio

The amount ($W_{PLH}$, $W_{PLL}$) of PLH and PLL and their mixing ratio ($W_{PLH}/W_{PLL}$) by weight are determined as follows:

(i) Plasticizers (PLL, PLH) are extracted from the support substrate by the method described in (2-1) above. With this, solvent-insoluble components and solvent-soluble components (i.e. the components extracted with the solvent) are weighed separately.

(ii) With respect to the extracted components, by suitably employing the $^1$H-NMR and $^{13}$C-NMR in (1-4) above and the analytical methods according to (1-3), (1-5) and (1-7) above, the chemical structures of the components in the extract are identified, and their formula weights (molecular weights) are determined. To identify the chemical structures, a known collection of spectra data and the like can be used as necessary.

(iii) Based on the $^1$H-NMR spectrum of (1-4) above, from the numbers of protons (integration ratio) of PLH, PLL and other components, the molar ratio of the respective components is determined. To the results, the formula weights determined in (ii) above are applied to determine the weight ratio of the respective components. From this weight ratio, the mixing ratio ($W_{PLH}/W_{PLL}$) is determined.

(iv) From the weight ratios obtained in (i) and (ii) above, the weight ratios of PLH and PLL to the total weight of the support substrate are determined.

In some cases, as another method, to the molar ratio of the respective components determined from the integration ratio in the $^1$H-NMR of (ii) above, the molecular weights of the respective components determined by GPC described in (2-2) above are applied to determine the mixing ratio ($W_{PLH}/W_{PLL}$).

As for yet another method, when PLH and PLL can be separated with good resolution in the analysis (1-7) in (ii) (when the peaks of these components are well separated), PLH and PLL are collected in fractions, respectively, by the method described in (1-8) above; and from their dry weights, the mixing ratio ($W_{PLH}/W_{PLL}$) can be determined.

The molecular weight of the plasticizer used in fabricating the PVC film (i.e. the unused plasticizer or the starting plasticizer) can be determined by using, for instance, an analytical sample prepared by directly dissolving the starting plasticizer in THF, instead of the analytical sample of (2-2) prepared by extracting the plasticizer from the support substrate. More specifically, the starting plasticizer is dissolved in THF to a concentration (e.g. 10 mg plasticizer to 10 mL THF) indicated in (1-9) above to prepare an analytical sample; and this is analyzed with the device and under the conditions described in (1-9) above; and from the resulting chromatogram, the molecular weights are determined in the same manner as (2-2) above. Although not limited to this, the PVC film that satisfies the preferable mixing ratio ($W_{PLH}/W_{PLL}$) disclosed herein can be obtained, for instance, by selecting a plasticizer classified as PLH and a plasticizer classified as PLL based on the molecular weights determined by the method described above and adding these in accordance with a desirable $W_{PLH}/W_{PLL}$. It is noted, however, that the disclosure in this paragraph is merely an example and does not limit the scope of the invention disclosed herein.

(3) Analysis of Antioxidant (3-1) Compositional Analysis

By the same procedure as (2-1) above, 90 mL of a chloroform solution containing antioxidant extracted from the support substrate is collected. The same chloroform solution collected in (2-1) or (2-2) can also be used for this analysis. Using this chloroform solution, the antioxidant is identified and analyzed for the composition by applying solely one or a combination of two or more suitable analytical methods among the HPLC, FT-IR, $^1$H-NMR, $^{13}$C-NMR and LC/FT-MS described above.

(3-2) Quantitative Analysis

From the PVC adhesive tape, PSA is removed and 0.2 g of the support substrate (typically a PVC film) obtained thereby is suspended in 30 mL of THF. After stirring this at room temperature for 30 minutes, the solution is collected in a fraction. The procedure of immersing the support substrate in 30 mL of fresh THF followed by stirring and then collecting the solution in a fraction is repeated twice. 90 mL of a THF solution containing antioxidant extracted from the support substrate is thus collected. Reprecipitation is carried out by means of adding the THF solution to a 100-fold volume of methanol and the resulting supernatant is filtered through a membrane filter and subjected to HPLC analysis to obtain a chromatogram. Using the peak of the antioxidant shown in the chromatogram, a standard curve is prepared with the standard being the antioxidant identified by the compositional analysis, and the antioxidant is quantified.

(4) Analysis of Aliphatic Acid Metal Salt

By X-ray fluorescence analysis (XRF) carried out with the device and under the conditions shown below, the metal species constituting the aliphatic acid metal salt can be qualitatively analyzed. More specifically, the adhesive face (PSA layer surface) of the PVC adhesive tape is bonded to filter paper of 20 mm diameter and irradiated with X-rays from the support substrate side.

(Device and Conditions)
Device: Rigaku Co., Ltd., ZSX100e
X-ray source: vertical Rh tube
Elements analyzed: B to U
Analyzed area: ø20 mm
X-ray output and dispersive crystals: as shown in Table 1

TABLE 1

| Element | B, C | N | O | F to Mg | Al, Si | P to Cl | K, Ca | Ti to U |
|---|---|---|---|---|---|---|---|---|
| X-ray output (kV, mA) | 30, 120 | 30, 120 | 30, 120 | 30, 120 | 30, 120 | 30, 120 | 40, 90 | 50, 72 |
| Dispersive crystal | RX60 | RX40 | RX35 | TAP | PET | Ge | LiF | LiF |

<Applications>

The PSA tape disclosed herein can be used for protecting and binding electric wires, pipes and the like; covering corrugated tubes that wrap and protect electric wires and the like; electric insulation; and so on. Particularly preferable applications that take advantage of the good anti-fogging properties include wrapping of an electric wire (typically a plurality of electric wires) constituting a wire harness (e.g. a wire harness for automobiles and other vehicles, especially wire harnesses for vehicles comprising internal combustion engines, etc.). Here, examples of the embodiment of the PVC adhesive tape wrapped around electric wires forming a wire harness include an embodiment of the PVC adhesive tape wrapped around the electric wires and an embodiment of the PVC adhesive tape wrapped around a tube (e.g. corrugated tube) containing the electric wires. The PSA tape disclosed herein is not limited to these applications and can be favorably used in various fields where PVC adhesive tapes are used, for instance, in fields including interlayer and outer surface insulation, attachment, labeling and identification of electric parts (transformers, coils, etc.), electronic components and the like.

The matters disclosed by this description include the following:

(1) A PSA tape that comprises a polyvinyl chloride (PVC) film comprising a plasticizer, and a PSA layer placed at least on one face of the film, with the PSA tape yielding a condensation amount of about 5 mg or less in a condensation amount measurement carried out by storing a piece of the PSA tape having a surface area equivalent to a circle of 80 mm diameter at 120° C. for 16 hours.

(2) The PSA tape according to (1) above, wherein the PVC film has a plasticizer content of about 10 to 50% by weight.

(3) The PSA tape according to (1) or (2) above, wherein the PVC film comprises an aliphatic acid metal salt.

(4) The PSA tape according to (3) above, wherein the aliphatic acid metal salt comprises at least one metal species that belongs to any one of groups 1, 2, 12, 13 and 14 (but excluding Pb) of the periodic table.

(5) The PSA tape according to (3) or (4) above, wherein the aliphatic acid metal salt is at least one metal species selected from a group consisting of Li, Na, Ca, Mg, Zn, Ba and Sn.

(6) The PSA tape according to any of (3) to (5) above, wherein the aliphatic acid metal salt is a metal stearate, metal laurate, or a combination of a metal stearate and a metal laurate.

(7) The PSA tape according to any of (3) to (6) above, wherein the aliphatic acid metal salt content in the PVC film is about 0.02% by weight or greater, but about 1% by weight or less.

(8) The PSA tape according to any of (1) to (7) above, wherein the PVC film comprises an antioxidant (e.g. a hindered phenol-based antioxidant).

(9) The PSA tape according to (8) above, wherein the antioxidant content in the PVC film is about 0.05% by weight or greater, but about 10% by weight or less.

(10) The PSA tape according to any of (1) to (9) above, wherein the PVC film comprises, as the plasticizer, a polyester-based plasticizer having a molecular weight of 1000 or greater and a carboxylic acid ester having a molecular weight of less than 1000.

(11) The PSA tape according to (10) above, wherein the PVC film is such that the polyester-based plasticizer having the molecular weight of 1000 or greater has a weight $W_{PLH}$ and the carboxylic acid ester having the molecular weight of less than 1000 has a weight $W_{PLL}$, satisfying the next formula:

$$1 \leq (W_{PLH}/W_{PLL}) \leq 50$$

(12) The PSA tape according to (10) or (11) above, wherein the carboxylic acid ester having the molecular weight of less than 1000 comprises an aromatic carboxylic acid ester.

(13) The PSA tape according to (12) above, wherein the aromatic carboxylic acid ester comprises at least either a trimellitic acid ester or a pyromellitic acid ester.

(14) The PSA tape according to any of (10) to (13) above, wherein the carboxylic acid ester having the molecular weight of less than 1000 comprises an ester of a carboxylic acid and an alkyl alcohol with 6 to 14 carbon atoms.

(15) The PSA tape according to any of (10) to (14) above, wherein the amount of the carboxylic acid ester having the molecular weight of less than 1000 contained in the PVC film is about 1 part by weight or greater, but about 10 parts by weight or less relative to 100 parts by weight of PVC.

(16) The PSA tape according to any of (10) to (15) above, wherein the polyester-based plasticizer having the molecular weight of 1000 or greater comprises an adipic acid-based polyester plasticizer.

(17) The PSA tape according to any of (10) to (16) above, wherein the polyester-based plasticizer having the molecular weight of 1000 or greater comprises an adipic acid-based polyester plasticizer having a molecular weight of about 3000 or greater, but about 7000 or less.

(18) The PSA tape according to any of (10) to (17) above, wherein the amount of the polyester-based plasticizer having the molecular weight of 1000 or greater contained in the PVC film is about 25 parts by weight or greater, but less than about 60 parts by weight relative to 100 parts by weight of PVC.

(19) The PSA tape according to any of (1) to (18) above, wherein the PVC film comprises an elastomer.

(20) The PSA tape according to (19) above, wherein the elastomer content in the PVC film is about 1% by weight or greater, but about 30% by weight or less.

(21) The PSA tape according to (20) above, wherein the elastomer comprises one, two or more species selected among:

(A) a chlorinated polyethylene having a chlorine content of about 25 to 50% by weight (e.g. about 35 to 45% by weight), (B) a (meth)acrylic acid ester-butadiene-styrene copolymer, (C) an acrylonitrile-butadiene copolymer having an acrylonitrile content of about 15 to 50% by weight (e.g. about 30 to 40% by weight), and (D) an ethylene-vinyl acetate copolymer having a vinyl acetate content of about 30 to 75% by weight (e.g. about 50 to 65% by weight).

(22) The PSA tape according to any of (1) to (21) above, wherein the PSA layer is a rubber-based PSA layer comprising a rubber-based PSA as the primary component.

(23) The PSA tape according to any of (1) to (22) above, wherein the PSA layer comprises a natural rubber and a synthetic rubber (e.g. SBR) at a weight ratio of about 10:90 to 90:10.

(24) The PSA tape according to any of (1) to (23) above, wherein the PSA layer comprises one, two or more species of tackifier resin selected among rosin-based resins, petroleum resins, terpene-based resins, phenolic resins, coumarone-indene-based resins and ketone resins.

(25) The PSA tape according to any of (1) to (24) above, wherein the PSA layer comprises a rubber-based polymer and a tackifier resin, wherein the tackifier resin content is about 50 to 150 parts by weight relative to 100 parts by weight of the rubber-based polymer.

(26) A wire harness comprising electric wires and the PSA tape according to any of (1) to (25) above wrapped around the electric wires.

EXAMPLES

Several worked examples relating to the present invention are described below, but the present invention is not limited to these examples. In the description below, "parts" and "%" are based on weight unless otherwise specified.
<Materials Used>
The materials used in Examples below and their abbreviations are listed below.
(Polyvinyl Chloride (PVC))
A: product of Shin-Etsu Chemical Co., Ltd.; degree of polymerization 1300, product name "TK-1300"
C: product of Shin-Etsu Chemical Co., Ltd.; degree of polymerization 1000, product name "TK-1000"
(Antioxidant)
A: product of BASF Corporation, phenolic antioxidant, product name "IRGANOX 1010"
(Aliphatic Acid Metal Salts)
A: calcium stearate (product of Kishida Chemical Co., Ltd.)
B: zinc laurate (product of Mitsuwa Chemicals Co., Ltd.)
(Plasticizers)
H1: product of DIC Corporation, adipic acid-based polyester plasticizer, product name "W-360ELS" (molecular weight 2800, value measured based on the method described above)

H2: product of DIC Corporation, adipic acid-based polyester plasticizer, product name "W-2300" (molecular weight 3200, value measured based on the method described above)

H3: product of DIC Corporation, adipic acid-based polyester plasticizer, product name "W-4010" (molecular weight 5800, value measured based on the method described above)

L1: product of J-Plus Co., Ltd., diisononyl phthalate, product name "DINP" (molecular weight 504, value measured based on the method described above)

L3: product of DIC Corporation, tri-2-ethylhexyl trimellitate, product name "W-705" (molecular weight 750, value measured based on the method described above)

L4: product of Kao Corporation, triisodecyl trimellitate, product name "TRIMEX T-10" (molecular weight 810, value measured based on the method described above)

L5: product of ADEKA Corporation, tetra-2-ethylhexyl pyromellitate, product name "UL-80" (molecular weight 834, value measured based on the method described above)
(Elastomers)
A: product of Showa Denko K.K., chlorinated polyethylene, 30.0% to 33.0% chlorine content, product name "ELASLEN 301A"
C: product of Zeon Corporation, acetonitrile-butadiene rubber, about 36% nitrile content, product name "ZETPOL 2000"
<Fabrication of PSA Tape>

Example 1

Based on solid content, were mixed 60 parts of an SBR latex (available from Zeon Corporation, product name "NIPOL LX426"), 40 parts of a natural rubber latex (available from Golden Hope, product name "HYTEX HA") and 120 parts of a petroleum resin emulsion to prepare a water-dispersed rubber-based PSA composition. To prepare the petroleum resin emulsion, was dissolved 75 parts of a petroleum resin (available from Exxon, aliphatic acid-based hydrocarbon resin, product name "ESCOREZ 1202" (softening point 100° C.)) in 25 parts of toluene; to the resultant, were added 3.5 parts of a surfactant (available from Kao Corporation, product name "EMULGEN 920") and 46.5 parts of water; and the mixture was stirred and emulsified with a homo-mixer. The resulting PSA composition is referred to as the "PSA composition A" hereinafter.

The respective starting materials shown in Table 2 were weighed out and mixed together to form the composition shown in the same table (i.e. the composition formed of 0.10% antioxidant A, 0.20% aliphatic acid metal salt A, 23% plasticizer H3 and 3% plasticizer L5 with the remaining part being polyvinyl chloride A). After kneaded, with a calender molding machine, at a molding temperature of 150° C., the mixture was molded into a long sheet (film) of 110 μm thickness. PVC film according to Example 1 was thus obtained.

Using a comma direct coater, to a surface of the PVC film, the PSA composition A was applied and dried. The coating amount of PSA composition A was adjusted so that the PSA layer formed had a thickness of 20 μm after dried. This was slit to a width of 19 mm to obtain a PSA tape according to Example 1, with the tape having a PSA layer on one surface of the PVC film.

Examples 2-5 and Comparative Examples 1-2

The composition and the thicknesses of the PVC film and PSA layer used were as shown in Table 2. Otherwise in the same manner as Example 1, PSA tapes according to Examples 2 to 5 and Comparative Examples 1 to 2 were fabricated.

<Measurements and Evaluations>
(Condensation Amount)

Condensation amount was measured according to the condensation amount measurement method described above. More specifically, the PSA tape (19 mm width) according to each example was cut to a suitable length and was applied to an aluminum foil (available from Toyo Aluminium Ekco Products Co., Ltd., product name "SUN FOIL") in the width direction with no open spaces. This was cut along with the aluminum foil to a circle of 80 mm diameter. A test sample was thereby prepared with the adhesive face of the PSA tape piece having a surface area equivalent to a circle of 80 mm diameter being bonded to the aluminum foil. The test sample was stored for one hour with the Al foil side up in a desiccator (standard desiccator available from As One Corporation, product name "SD-UTG") moisture-controlled with silica gel (silica gel in a non-woven fabric pouch available from Toyotakako Co., Ltd., product name "N100G"). Using a fogging tester model "HAAKE Phoenix II" available from Thermo Electron Corporation, a beaker was stored in an oil bath set at 120° C. for one hour to condition the inside of the beaker in advance; and then the test sample was placed at the inner bottom of the beaker. On the top opening of the beaker, an Al plate (available from Namekawa Keido Co., Ltd., A5052, 110 mm long, 110 mm wide, 3 mm thick) was placed and kept cool at a constant temperature of 21° C. After 16 hours, the Al plate was removed and left standing in a fume hood for 24 hours, laid horizontally with the face that had faced the inside of the beaker being on the upper side. Subsequently, the weight of the Al plate (weight of the post-test Al plate) was measured. The Al plate was weighed both before and after the test, using a scale model "XP504DRV" available from Mettler-Toledo International Inc. From the results, the condensation amount (mg) was determined by the equation (I).

(Measurement of Degree of Fogging)

The degree of fogging was measured according to the fogging degree measurement method described above. More specifically, in the same manner as the test sample for the condensation amount measurement, a test sample was prepared with the adhesive face of the PSA tape piece having a surface area equivalent to a circle of 80 mm diameter being bonded to the aluminum foil, and stored in a desiccator for one hour. Using a fogging tester model "HAAKE Phoenix II" available from Thermo Electron Corporation, a beaker was stored in an oil bath set at 120° C. for one hour to condition the inside of the beaker in advance; and then the test sample was placed at the inner bottom of the beaker. A steel ring of 80 mm diameter was placed on top to keep the sample in place. On the top opening of the beaker, an O-ring (available from EKO Instruments, product name "VITON SEAL" (95 mm inner diameter, 4 mm thick, Shore A hardness 60±5)) was placed and then topped with a glass plate (available from EKO Instruments, 110 mm long, 110 mm wide, 3±0.2 mm thick). The glass plate was kept cool at a constant temperature of 21° C. After 3 hours, the glass plate was removed and left standing in a fume hood for one hour, laid horizontally with the face that had faced the inside of the beaker being on the upper side. Then, with respect to the face that had faced the inside of the beaker, the 60°-incidence reflectance R1(%) of the post-test glass plate was measured. The 60°-incidence reflectance (%) of the glass plate was measured both before and after the test, using a gloss meter under model name "GM-268 plus" available from Konica Minolta. From the results, the degree of fogging (%) was determined by the equation (II).

(Initial Adhesive Strength)

The PSA tape (19 mm width) according to each example was cut to a suitable length. In an environment at 23° C. and 50% RH, this was press-bonded to a stainless steel plate (SUS304BA plate) as the adherend with a 2 kg roller moved back and forth once. This was left standing in the environment at 23° C. and 50% RH for 30 minutes. Subsequently, based on JIS Z0237:2009, using a tensile tester, at a tensile speed of 300 mm/min, it was measured for 180° peel strength (N/19 mm).

(Holding Power)

According to the holding power measurement method described above, the PSA tape according to each example was assessed for holding power.

The results are shown in Table 2 along with specifications of the PSA tape compositions according to the respective examples.

[Table 2]

TABLE 2

| | | | Examples | | | | | Comp. Ex. | |
|---|---|---|---|---|---|---|---|---|---|
| | | | 1 | 2 | 3 | 4 | 5 | 1 | 2 |
| Thickness (μm) | Support substrate | | 110 | 110 | 130 | 130 | 110 | 130 | 110 |
| | PSA layer | | 20 | 20 | 20 | 20 | 20 | 20 | 30 |
| Substrate composition (wt %) | PVC (remaining part) | | A | C | A | A | A | A | A |
| | Antioxidant | A | 0.10 | 0.10 | — | — | — | 0.40 | — |
| | Aliphatic acid metal salt | A | 0.20 | 0.20 | 0.10 | 0.10 | 0.20 | 0.10 | — |
| | | B | — | — | 0.10 | 0.10 | — | 0.10 | — |
| | Plasticizer | H1 | — | — | 30 | — | — | — | — |
| | | H2 | — | 25 | — | 20 | — | — | — |
| | | H3 | 23 | — | — | — | 25 | — | — |
| | | L1 | — | — | — | — | — | 31 | — |
| | | L3 | — | 6 | 3 | — | — | — | — |
| | | L4 | — | — | — | 15 | 6 | — | — |
| | | L5 | 3 | — | — | — | — | — | — |
| | $W_{PLH}/W_{PLL}$ | | 7.7 | 4.2 | 10.0 | 1.3 | 4.2 | — | — |
| | Elastomer | A | — | — | — | 6 | — | — | — |
| | | C | — | — | — | — | — | 6 | — |

TABLE 2-continued

| | Examples | | | | | Comp. Ex. | |
|---|---|---|---|---|---|---|---|
| | 1 | 2 | 3 | 4 | 5 | 1 | 2 |
| Condensation amount (mg) | 1.2 | 3.0 | 2.3 | 2.0 | 2.1 | 6.3 | 5.7 |
| Degree of fogging (%) | 90 | 88 | 75 | 78 | 85 | 37 | 62 |
| Initial adhesive strength (N/19 mm) | 3.8 | 2.7 | 2.4 | 3.2 | 2.6 | 3.3 | 1.7 |
| Holding power (min) | 270 | 160 | 320 | 120 | 220 | 20 | 420 |
| Flexibility | G | G | G | G | G | G | P |

As shown in Table 2, the PSA tapes of Examples 1 to 5 with condensation amount of 5 mg or less exhibited clearly greater anti-fogging properties as compared to the PSA tapes of Comparative Examples 1 and 2 with condensation amount exceeding 5 mg. The PSA tapes of Examples 1 to 5 showed favorable flexibility as PVC adhesive tape because they contained suitable amounts of plasticizer in the PVC film. On the other hand, the PSA tape of Comparative Example 2 using a plasticizer-free PVC film lacked the flexibility generally required of PVC adhesive tape.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 2 PVC adhesive tapes (PSA tapes)
11 support substrate
11A first face
11B second face
21, 22 PSA layer
21A surface (adhesive face)

The invention claimed is:

1. A pressure-sensitive adhesive tape comprising
a polyvinyl chloride film comprising a plasticizer, and
a pressure-sensitive adhesive layer placed at least on one face of the polyvinyl chloride film,
wherein the plasticizer is a polyester-based plasticizer having a weight average molecular weight of 1000 or greater and a carboxylic acid ester having a weight average molecular weight of less than 1000,
the amount of the carboxylic acid ester having the molecular weight of less than 1000 contained in the polyvinyl chloride film is 1 part by weight or greater and 30 parts by weight or less relative to 100 parts by weight of polyvinyl chloride,
wherein the polyester-based plasticizer having the weight average molecular weight of 1000 or greater of the polyvinyl chloride film satisfies the formula:

$1 \le (W_{PLH}/W_{PLL}) \le 15$, wherein $W_{PLH}$ is the amount by weight of the polyester-based plasticizer having the weight average molecular weight of 1000 or greater contained in the polyvinyl chloride film, and wherein $W_{PLL}$ is the amount by weight of the carboxylic acid ester having the weight average molecular weight of less than 1000 contained in the polyvinyl chloride film, and
with the pressure-sensitive adhesive tape yielding a condensation amount of 5 mg or less in a condensation amount measurement carried out by storing a piece of the pressure-sensitive adhesive tape having a surface area equivalent to a circle of 80 mm diameter at 120° C. for 16 hours.

2. The pressure-sensitive adhesive tape according to claim 1, wherein the plasticizer content in the polyvinyl chloride film is 10% by weight or greater, but 50% by weight or less.

3. The pressure-sensitive adhesive tape according to claim 1, wherein the polyvinyl chloride film comprises an aliphatic acid metal salt.

4. The pressure-sensitive adhesive tape according to claim 3, wherein the aliphatic acid metal salt comprises at least one metal species that belongs to any one of groups 1, 2, 12, 13 and 14 (but excluding Pb) of the periodic table.

5. The pressure-sensitive adhesive tape according to claim 3, wherein the aliphatic acid metal salt comprises at least one metal species selected from a group consisting of Li, Na, Ca, Mg, Zn, Ba and Sn.

6. The pressure-sensitive adhesive tape according to claim 3, wherein the aliphatic acid metal salt is a metal stearate, metal laurate, or a combination of a metal stearate and a metal laurate.

7. The pressure-sensitive adhesive tape according to claim 1, wherein the carboxylic acid ester having the weight average molecular weight of less than 1000 comprises an ester of a carboxylic acid and an alkyl alcohol with 6 to 14 carbon atoms.

8. The pressure-sensitive adhesive tape according to claim 1, wherein the carboxylic acid ester having the weight average molecular weight of less than 1000 comprises at least either a trimellitic acid ester or a pyromellitic acid ester.

9. The pressure-sensitive adhesive tape according to claim 1, wherein the polyester-based plasticizer having the weight average molecular weight of 1000 or greater comprises an adipic acid-based polyester plasticizer having a weight average molecular weight of 3000 or greater, but 7000 or less.

10. The pressure-sensitive adhesive tape according to claim 1, wherein the amount of the carboxylic acid ester having the weight average molecular weight of less than 1000 contained in the polyvinyl chloride film is 1 part by weight or greater, but 10 parts by weight or less relative to 100 parts by weight of polyvinyl chloride.

11. The pressure-sensitive adhesive tape according to claim 1, wherein the polyvinyl chloride film comprises an antioxidant.

12. The pressure-sensitive adhesive tape according to claim 1, wherein the polyvinyl chloride film comprises an elastomer.

13. The pressure-sensitive adhesive tape according to claim 1, wherein the pressure-sensitive adhesive layer comprises a rubber-based polymer and a tackifier resin, wherein the tackifier resin content is 50 parts by weight or greater, but 150 parts by weight or less relative to 100 parts by weight of the rubber-based polymer.

14. The pressure-sensitive adhesive tape according to claim 13, wherein the pressure-sensitive adhesive layer comprises one, two or more species of tackifier resin selected among rosin-based resins, petroleum resins, terpene-based resins, phenolic resins, coumarone-indene-based resins and ketone resins.

15. The pressure-sensitive adhesive tape according to claim 14, wherein the pressure-sensitive adhesive layer is a rubber-based pressure-sensitive adhesive layer comprising a rubber-based pressure-sensitive adhesive as the primary component.

16. A wire harness comprising electric wires and the pressure-sensitive adhesive tape according to claim 1 wrapped around the electric wires.

17. A pressure-sensitive adhesive tape comprising
a polyvinyl chloride film comprising a plasticizer, and
a pressure-sensitive adhesive layer placed at least on one face of the polyvinyl chloride film, wherein
the plasticizer content in the polyvinyl chloride film is 10% by weight or greater, but 50% by weight or less,
the polyvinyl chloride film comprises, as the plasticizer, a polyester-based plasticizer having a weight average molecular weight of 1000 or greater and a carboxylic acid ester having a weight average molecular weight of less than 1000,
the carboxylic acid ester having the weight average molecular weight of less than 1000 comprises at least either a trimellitic acid ester or a pyromellitic acid ester,
the polyester-based plasticizer having the weight average molecular weight of 1000 or greater comprises an adipic acid-based polyester plasticizer having a weight average molecular weight of 3000 or greater, but 7000 or less,
the amount of the carboxylic acid ester having the weight average molecular weight of less than 1000 contained in the polyvinyl chloride film is 1 part by weight or greater and 30 parts by weight or less relative to 100 parts by weight of polyvinyl chloride,
the pressure-sensitive adhesive layer comprises a rubber-based polymer and a tackifier resin, wherein the tackifier resin content is 50 parts by weight or greater, but 150 parts by weight or less relative to 100 parts by weight of the rubber-based polymer, and
wherein the polyester-based plasticizer having the weight average molecular weight of 1000 or greater of the polyvinyl chloride film satisfies the formula:

$$1 \leq (W_{PLH}/W_{PLL}) \leq 15,$$

wherein $W_{PLH}$ is the amount by weight of the polyester-based plasticizer having the weight average molecular weight of 1000 or greater contained in the polyvinyl chloride film, and wherein $W_{PLL}$ is the amount by weight of the carboxylic acid ester having the weight average molecular weight of less than 1000 contained in the polyvinyl chloride film.

* * * * *